(12) United States Patent
Falter et al.

(10) Patent No.: US 9,619,552 B2
(45) Date of Patent: Apr. 11, 2017

(54) CORE DATA SERVICES EXTENSIBILITY FOR ENTITY-RELATIONSHIP MODELS

(71) Applicants: Timm Falter, Walldorf (DE); Daniel Hutzel, Walldorf (DE); Stefan Baeuerle, Walldorf (DE)

(72) Inventors: Timm Falter, Walldorf (DE); Daniel Hutzel, Walldorf (DE); Stefan Baeuerle, Walldorf (DE)

(73) Assignee: SAP SE, Walldorf (DE)

( * ) Notice: Subject to any disclaimer, the term of this patent is extended or adjusted under 35 U.S.C. 154(b) by 654 days.

(21) Appl. No.: 14/020,675

(22) Filed: Sep. 6, 2013

(65) Prior Publication Data
US 2015/0074136 A1   Mar. 12, 2015

(51) Int. Cl.
*G06F 17/30*   (2006.01)

(52) U.S. Cl.
CPC .............. *G06F 17/30604* (2013.01)

(58) Field of Classification Search
None
See application file for complete search history.

(56) References Cited

U.S. PATENT DOCUMENTS

| | | |
|---|---|---|
| 5,761,493 A | 6/1998 | Blakeley et al. |
| 5,956,706 A | 9/1999 | Carey et al. |
| 5,999,908 A | 12/1999 | Abelow |
| 6,038,558 A | 3/2000 | Powers et al. |
| 6,195,709 B1 | 2/2001 | Gupner et al. |
| 6,516,310 B2 | 2/2003 | Paulley |
| 6,560,598 B2 | 5/2003 | Delo et al. |
| 6,567,798 B1 | 5/2003 | Hollberg et al. |
| 6,631,382 B1 | 10/2003 | Kouchi et al. |
| 6,732,084 B1 | 5/2004 | Kabra et al. |
| 6,799,184 B2 | 9/2004 | Bhatt et al. |
| 6,836,777 B2 | 12/2004 | Holle |
| 6,898,603 B1 | 5/2005 | Petculescu et al. |
| 6,938,041 B1 | 8/2005 | Brandow et al. |
| 6,957,214 B2 | 10/2005 | Silberberg |
| 6,996,568 B1 | 2/2006 | Bedell et al. |
| 7,107,497 B2 | 9/2006 | McGuire et al. |
| 7,194,744 B2 | 3/2007 | Srivastava et al. |
| 7,225,197 B2 | 5/2007 | Lissar et al. |
| 7,290,181 B2 | 10/2007 | D'Angelo et al. |

(Continued)

OTHER PUBLICATIONS

Pattern: Fill Transient Attributes of Persistent Nodes; SAP; Jul. 6, 2013; p. 1.

(Continued)

*Primary Examiner* — Tyler Torgrimson
(74) *Attorney, Agent, or Firm* — Fountainhead Law Group P.C.

(57) ABSTRACT

Embodiments extend the relational model and query language to recognize features of tables and higher level entity-relationship models (ERMs). Extension language is implemented in the data design language (DDL) to incorporate tables, entities (and views) having custom-defined/semantic structure, rather than being limited to primitive types (e.g. flat tables as in standard SQL). The extension language includes an indication that a query is to include all active elements for each table extension or entity extension that is active. The extension language can be chained to extend a table or entity that has been extended.

18 Claims, 10 Drawing Sheets

(56) References Cited

U.S. PATENT DOCUMENTS

| | | |
|---|---|---|
| 7,302,447 B2 | 11/2007 | Dettinger et al. |
| 7,305,414 B2 | 12/2007 | Manikutty et al. |
| 7,340,451 B2 | 3/2008 | Sacco |
| 7,380,169 B2 | 5/2008 | Fossum et al. |
| 7,398,530 B1 | 7/2008 | Parla et al. |
| 7,421,448 B2 | 9/2008 | Spork |
| 7,434,230 B2 | 10/2008 | Harold et al. |
| 7,481,368 B2 | 1/2009 | Wang et al. |
| 7,505,983 B2 | 3/2009 | Wildhagen et al. |
| 7,523,090 B1 | 4/2009 | Sundman et al. |
| 7,631,012 B2 | 12/2009 | Harvey |
| 7,640,357 B2 | 12/2009 | Kirov et al. |
| 7,653,828 B2 | 1/2010 | Kostadinov et al. |
| 7,672,960 B2 | 3/2010 | Anonsen |
| 7,680,782 B2 | 3/2010 | Chen et al. |
| 7,689,612 B2 | 3/2010 | Helsen et al. |
| 7,693,819 B2 | 4/2010 | Stoychev |
| 7,761,481 B2 | 7/2010 | Gaurav et al. |
| 7,765,222 B2 | 7/2010 | Styles et al. |
| 7,765,224 B2 | 7/2010 | Li et al. |
| 7,788,241 B2 | 8/2010 | Cheng et al. |
| 7,805,433 B2 | 9/2010 | Dickerman et al. |
| 7,818,754 B2 | 10/2010 | Morris et al. |
| 7,836,070 B2 | 11/2010 | Forstmann |
| 7,873,605 B2 | 1/2011 | Bhattacharyya et al. |
| 7,885,840 B2 | 2/2011 | Sadiq et al. |
| 7,895,226 B2 | 2/2011 | Koch et al. |
| 7,912,820 B2 | 3/2011 | Garden et al. |
| 7,917,549 B2 | 3/2011 | Arazi |
| 7,937,401 B2 | 5/2011 | Pasumansky et al. |
| 7,970,823 B2 | 6/2011 | Moeller et al. |
| 7,975,254 B2 | 7/2011 | Gilboa |
| 7,996,443 B2 | 8/2011 | Nori et al. |
| 8,005,850 B2 | 8/2011 | Walther et al. |
| 8,010,521 B2 | 8/2011 | Kissner et al. |
| 8,065,323 B2 | 11/2011 | Sallakonda et al. |
| 8,069,184 B2 | 11/2011 | Becker et al. |
| 8,078,643 B2 | 12/2011 | Mush et al. |
| 8,122,009 B2 | 2/2012 | Dettinger et al. |
| 8,146,103 B2 | 3/2012 | Schmidt et al. |
| 8,185,508 B2 | 5/2012 | Vemuri et al. |
| 8,191,081 B2 | 5/2012 | Schmidt et al. |
| 8,209,280 B2 | 6/2012 | Kearney et al. |
| 8,214,877 B1 | 7/2012 | Grimes et al. |
| 8,219,919 B2 | 7/2012 | Norring et al. |
| 8,250,094 B2 | 8/2012 | Skaria et al. |
| 8,255,368 B2 | 8/2012 | Cox |
| 8,281,283 B2 | 10/2012 | Speth et al. |
| 8,286,916 B2 | 10/2012 | Pauly et al. |
| 8,321,478 B2 | 11/2012 | Fong |
| 8,327,260 B2 | 12/2012 | Bays et al. |
| 8,347,207 B2 | 1/2013 | Borgsmidt et al. |
| 8,364,300 B2 | 1/2013 | Pouyez et al. |
| 8,364,724 B2 | 1/2013 | Stolte et al. |
| 8,370,400 B2 | 2/2013 | Brunswig et al. |
| 8,375,041 B2 | 2/2013 | Webster et al. |
| 8,386,916 B2 | 2/2013 | LeBrazidec et al. |
| 8,407,215 B2 | 3/2013 | Sheedy et al. |
| 8,407,237 B1 | 3/2013 | Kudryavtsev et al. |
| 8,407,262 B2 | 3/2013 | Hsu et al. |
| 8,407,309 B1 | 3/2013 | Feldman et al. |
| 8,412,673 B2 | 4/2013 | Weissenberger et al. |
| 8,417,732 B2 | 4/2013 | Rapp |
| 8,429,176 B2 | 4/2013 | Sigurbjornsson et al. |
| 8,473,506 B2 | 6/2013 | Sedlar et al. |
| 8,478,515 B1 | 7/2013 | Foucher et al. |
| 8,478,850 B2 | 7/2013 | Delany et al. |
| 8,484,210 B2 | 7/2013 | Loh et al. |
| 8,489,649 B2 | 7/2013 | Yalamanchi et al. |
| 8,504,522 B2 | 8/2013 | Wu et al. |
| 8,504,568 B2 | 8/2013 | Chandrasekhara et al. |
| 8,505,032 B2 | 8/2013 | Craddock et al. |
| 8,510,296 B2 | 8/2013 | Fan et al. |
| 8,515,982 B1 | 8/2013 | Hickman et al. |
| 8,805,875 B1 | 8/2014 | Bawcom et al. |
| 8,849,771 B2 | 9/2014 | Berg-Sonne |
| 9,047,334 B1 | 6/2015 | Cheriton |
| 9,182,956 B2 | 11/2015 | Zalmanovici |
| 2002/0100014 A1 | 7/2002 | Iborra et al. |
| 2002/0138820 A1 | 9/2002 | Daly |
| 2003/0009649 A1 | 1/2003 | Martin et al. |
| 2003/0135850 A1 | 7/2003 | Miloushev et al. |
| 2003/0140036 A1 | 7/2003 | Belowsov |
| 2003/0145255 A1 | 7/2003 | Harty et al. |
| 2004/0117759 A1 | 6/2004 | Rippert, Jr. et al. |
| 2004/0122817 A1 | 6/2004 | Kaiser |
| 2004/0153435 A1 | 8/2004 | Gudbjartsson et al. |
| 2004/0249856 A1 | 12/2004 | Garden et al. |
| 2005/0004904 A1 | 1/2005 | Kearney et al. |
| 2005/0010565 A1 | 1/2005 | Cushing et al. |
| 2005/0010581 A1 | 1/2005 | Doan |
| 2005/0065958 A1 | 3/2005 | Dettinger et al. |
| 2005/0187952 A1 | 8/2005 | Werner |
| 2005/0256889 A1 | 11/2005 | McConnell |
| 2005/0283459 A1 | 12/2005 | MacLennan et al. |
| 2006/0195460 A1 | 8/2006 | Nori et al. |
| 2006/0195476 A1 | 8/2006 | Nori et al. |
| 2006/0215448 A1* | 9/2006 | Ellis ............... G06F 17/30179 365/185.01 |
| 2006/0224634 A1 | 10/2006 | Hahn et al. |
| 2006/0235834 A1 | 10/2006 | Blakeley et al. |
| 2006/0242104 A1 | 10/2006 | Ellis et al. |
| 2006/0259912 A1 | 11/2006 | Weinrich et al. |
| 2007/0083572 A1* | 4/2007 | Bland ............... G06F 17/30563 |
| 2007/0118501 A1 | 5/2007 | Yan |
| 2007/0136335 A1* | 6/2007 | Dionne ............ G06F 17/30734 |
| 2007/0219976 A1 | 9/2007 | Muralidhar et al. |
| 2007/0226203 A1* | 9/2007 | Adya ................ G06F 17/30418 |
| 2008/0065862 A1 | 3/2008 | Hansen et al. |
| 2008/0071799 A1 | 3/2008 | Evans et al. |
| 2008/0091691 A1 | 4/2008 | Tsuji |
| 2008/0120604 A1 | 5/2008 | Morris |
| 2008/0133530 A1 | 6/2008 | Wang et al. |
| 2008/0222159 A1 | 9/2008 | Aranha et al. |
| 2008/0301168 A1 | 12/2008 | Adler et al. |
| 2009/0240664 A1 | 9/2009 | Dinker et al. |
| 2009/0292730 A1 | 11/2009 | Li et al. |
| 2009/0319546 A1 | 12/2009 | Shaik |
| 2010/0082646 A1 | 4/2010 | Meek et al. |
| 2010/0114935 A1 | 5/2010 | Polo-Malouvier et al. |
| 2010/0131568 A1 | 5/2010 | Weinberg et al. |
| 2010/0241637 A1 | 9/2010 | Kissner et al. |
| 2010/0293523 A1 | 11/2010 | Ahadian et al. |
| 2010/0318499 A1 | 12/2010 | Arasu et al. |
| 2011/0154226 A1 | 6/2011 | Guertler et al. |
| 2011/0161371 A1 | 6/2011 | Thomson et al. |
| 2011/0225176 A1 | 9/2011 | Siegel et al. |
| 2011/0231454 A1 | 9/2011 | Mack |
| 2011/0238437 A1 | 9/2011 | Zhou et al. |
| 2011/0302212 A1 | 12/2011 | Agrawal et al. |
| 2012/0005190 A1 | 1/2012 | Faerber et al. |
| 2012/0016901 A1 | 1/2012 | Agarwal et al. |
| 2012/0054142 A1 | 3/2012 | Du et al. |
| 2012/0059802 A1 | 3/2012 | Daniello et al. |
| 2012/0109661 A1 | 5/2012 | Lueckhoff |
| 2012/0130942 A1 | 5/2012 | Dipper |
| 2012/0131392 A1 | 5/2012 | Bendig |
| 2012/0136868 A1 | 5/2012 | Hammerschmidt et al. |
| 2012/0143810 A1 | 6/2012 | Berg-Sonne |
| 2012/0144383 A1 | 6/2012 | Mishra et al. |
| 2012/0215768 A1 | 8/2012 | Zellweger |
| 2012/0239987 A1 | 9/2012 | Chow et al. |
| 2012/0265734 A1 | 10/2012 | Perez et al. |
| 2013/0110879 A1 | 5/2013 | Winternitz et al. |
| 2013/0111310 A1 | 5/2013 | de Oliveira et al. |
| 2013/0117346 A1 | 5/2013 | Figus |
| 2013/0151560 A1 | 6/2013 | Zurek |
| 2013/0159354 A1 | 6/2013 | Heinzl et al. |
| 2013/0166602 A1 | 6/2013 | Brunswig et al. |
| 2013/0246355 A1 | 9/2013 | Nelson et al. |
| 2014/0149180 A1 | 5/2014 | Yaseen et al. |
| 2014/0245079 A1 | 8/2014 | Larson et al. |

(56) References Cited

U.S. PATENT DOCUMENTS

2014/0258777 A1    9/2014   Cheriton
2014/0330916 A1   11/2014   Xu et al.
2014/0380266 A1   12/2014   Bornhoevd et al.

OTHER PUBLICATIONS

Ruby on Rails Guides, "Active Record Validations," Aug. 8, 2013, downloaded from the Internet at <url>https://web.archive.org/web/20130808005838/http://guidessubyonrails.org/active_record_validations.html on 8127/15, pp. 1-37.

Bhargava, "Concurrency control in database systems," 1999, IEEE Transactions on Knowledge and Data Engineering, vol. 11, Issue 1, pp. 3-16.

Paton et al., "Identification of database objects by key," 2005, Advances in Object-Oriented Database Systems, vol. 334 of the series Lecture Notes in Computer Science, pp. 280-285.

Farber et al., "SAP HANA database: data management for modem business applications," 2011, ACM SIGMOD Record, vol. 40 Issue 4, pp. 45-51.

Graphics: Display Method (SAP-SERM); SAP Library—BC Data Modeler; 2004; pp. 1-5.

Abovesoft Utilities; www.AboveSoft.com; Sep. 2010; pp. 1-6.

Ayers, Lonnie, PMP; SAP BW Data Modeling; SAP-BW Consulting, Inc.; pp. 1-18, printed on Aug. 29, 2013.

Heilman, Rich, HANA Product Management, SAP Labs LLC; STEYN, Werner, Customer Solution Adoption, SAP Labs, LLC; SAP HANA SQL Script Basics & Troubleshooting; Oct. 2012; pp. 1-47.

\* cited by examiner

CORE DATA SERVICES EXTENSIBILITY FOR ENTITY-RELATIONSHIP MODELS

BACKGROUND

Embodiments relate to databases, and in particular, to extending a database language to accommodate higher level entity-relationship models.

Unless otherwise indicated herein, the approaches described in this section are not prior art to the claims in this application and are not admitted to be prior art by inclusion in this section.

A database is a powerful tool for the storage, organization, and analysis of large volumes of data. At a low level, a database may employ fundamental data definition and processing that is based upon a relational model. In particular, a data definition defines a data type with sufficient metadata being associated therewith. A data definition may also involve a definition of a database structure such as columns and tables. Many database structures rely upon Structured Query Language (SQL) as the standard database language to define, read, and manipulate data within a database. In its standard form, SQL itself reflects the basic relational model of the database.

Various other types of applications (e.g., toolsets) are constructed by developers to allow consumers to interact with the database in an efficient and intuitive manner. Such applications are typically provided in an application layer overlying the database.

The overlying applications, such as consumer technology and toolsets provided by developers, may introduce higher-level models, e.g., entity-relationship models (ERMs), in order to contribute semantics and ease consumption by the user. In particular, a plain data model on the SQL-level only contains the requisite information to process data on the SQL-level. Adding more information in a declarative fashion provides potential for higher-level engines to offload work from developers by contributing more semantics. Adding more information in a declarative fashion can also make data models more comprehensible, thereby easing their consumption by users.

One example of a higher-level model is an OData Entity Data Model (EDM). In particular, OData is a web protocol standard providing platform-agnostic interoperability for querying and updating data. OData leverages web technologies such as HTTP, Atom Publishing Protocol (AtomPub), and JSON (JavaScript Object Notation) in order to provide access to information from a variety of applications. The simplicity and extensibility of OData can provide consumers with a predictable interface for querying a variety of data sources.

Other examples of higher-level models may include the Semantic Layer in the Business Intelligence (BI) platform of SAP AG in Walldorf, Germany, Java Persistence API (JPA) and enterprise objects in Java, or the business objects frameworks in Advanced Business Application Programming (ABAP) of SAP AG. Also, the River programming model and the River Definition Language (RDL) of the River application development framework for SAP AG in Walldorf, Germany, are based upon entities linked by relationships.

Even though those higher-level models may share many commonalities, the individual information cannot be shared across stacks. That is, the higher-level models mentioned above contribute essentially the same kind of additional information, yet that information is provided in different ways that interfere with its being shared across higher-level models (e.g., between an OData EDM and an ERM created using RDL).

This situation results in a fragmented environment with information unable to be shared between applications. To cope with this fragmentation, redundant information is provided, with application developers and customers contributing the same essential information in multiple forms, thereby undesirably increasing overhead.

Furthermore, while the developers of consumer technologies may have some knowledge of SQL, they are generally not experts in complex SQL programming Thus, there is a need for an improved language for interacting with relational databases.

SUMMARY

Embodiments extend the relational model and query language to recognize features of tables and higher level entity-relationship models (ERMs). Extension language is implemented in the data design language (DDL) that defines organization of data and associated metadata in a database, to incorporate tables, entities (and views) having custom-defined/semantic structure, rather than being limited to primitive types (e.g., flat tables as in standard SQL). The extension language includes an indication that a query is to include all active elements for each table extension or entity extension that is active. The extension language extension can be chained to extend a table or entity that has been extended.

A computer-implemented method according to an embodiment comprises providing a database organized according to a relational model; providing a database engine in communication with the database utilizing a language describing the relational model; providing an application comprising a database model including at least one table, each table including at least one table extension; causing a query engine of the application to communicate a query to the database engine utilizing a first extension language, the first extension language comprising an indicator to include in the query all active elements for each table extension that is active, and causing the database engine to return a query result to the query engine based upon the first extension language.

In various embodiments, the method further comprises appending a second extension language to the database model before causing a query engine of the application to communicate a query to the database engine.

In various embodiments, the method further comprises appending a second extension language to a first table of the at least one table to associate the first table to a second table of the at least one table; and altering the query to utilize the second extension language.

A non-transitory computer readable storage medium embodies a computer program for performing a method comprising providing a database organized according to a relational model; providing a database engine in communication with the database utilizing a language describing the relational model; providing an application comprising a database model including at least one table, each table including at least one table extension; causing a query engine of the application to communicate a query to the database engine utilizing a first extension language, the first extension language comprising an indicator to include in the query all active elements for each table extension that is active, and causing the database engine to return a query result to the query engine based upon the first extension language.

An embodiment of a computer system comprises one or more processors and a software program executable on said computer system. The software program is configured to provide a database organized according to a relational model; provide a database engine in communication with the database utilizing a language describing the relational model; provide an application comprising a database model including at least one table, each table including at least one table extension; cause a query engine of the application to communicate a query to the database engine utilizing a first extension language, the first extension language comprising an indicator to include in the query all active elements for each table extension that is active, and cause the database engine to return a query result to the query engine based upon the first extension language.

In various embodiments, the language reflecting the relational model comprises SQL.

In various embodiments, the query is a view query based on the first extension language and the second extension language.

In various embodiments, the data model is an entity-relationship model that includes at least one entity extension, and the first extension language further comprises an indicator to include in the query all active elements for each entity extension that is active.

The following detailed description and accompanying drawings provide a better understanding of the nature and advantages of various embodiments.

DETAILED DESCRIPTION

Described herein are techniques for extending a relational model-based database language (e.g., Structured Query Language known as SQL), to accommodate higher level entity-relationship models. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
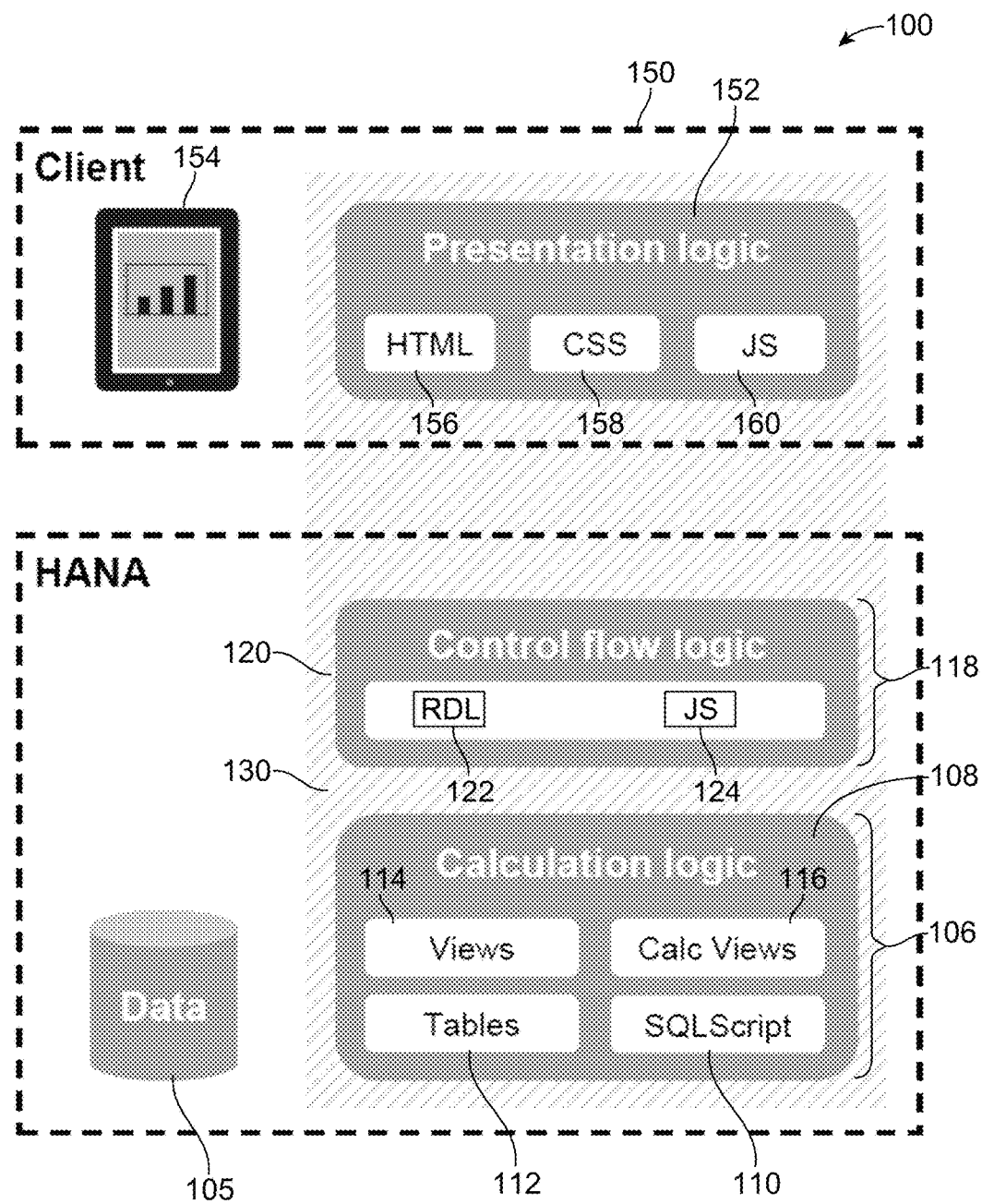
FIG. 1 shows a simplified view of a database system 100 according to an embodiment.

FIG. 1 shows a simplified view of a database system 100, according to an embodiment. In particular, the database system 100 comprises data 105 of the database itself, organized according to a relational model.

A lower layer 106 of the database system comprises calculation logic 108 that is designed to interact with the data 105 itself. Such calculation logic 108 may be performed by various engines (e.g., SQL engine, calculation engine, SQL script) in order to provide basic data definition and processing based on the relational model. Such basic data definition can include defining of data types making up the database, associated metadata, and the database structure (e.g. columns, tables). The lower layer 106 of the database system may include SQL script 110, as well as data structures such as tables 112, views 114, and calculation views 116.

The embodiment presented in FIG. 1 shows HANA, the in-memory database available from SAP AG of Walldorf, Germany, implemented as the database. However, embodiments are not limited to use with this particular database. Examples of other in-memory databases include, but are not limited to, the SYBASE IQ database also available from SAP AG; the Microsoft Embedded SQL for C (ESQL/C) database available from Microsoft Corp. of Redmond, Wash.; the Exalytics In-Memory database available from Oracle Corp. of Redwood Shores, Calif., etc.

Further, while the embodiment presented in FIG. 1 shows the database as comprising an in-memory database, various embodiments could be employed in conjunction with conventional disk-based database systems.

An application layer 118, overlying the calculation logic 108 of the database system 100 comprises control flow logic 120. The control flow logic 120 may be implemented utilizing River Definition Language (RDL) 122 and JavaScript (JS) 124 to reference model concepts such as entities and relationships that are not reflected in basic SQL. This control flow logic 120 may further comprise common languages for defining and consuming data across different containers (e.g. native, ABAP, Java).

As shown in FIG. 1, in order to facilitate the sharing of information across such different containers and thereby promote a more unified environment, the database system 100 may further comprise a Core Data Services (CDS) component 130. CDS component 130 comprises a common set of domain-specific languages (DSL) and services. The CDS component 130 may allow defining and consuming semantically rich data models as an integral part of the database structure, thereby permitting data modeling as well as the retrieval and processing of data to be raised to a higher semantic level that is closer to the conceptual thinking of domain experts. The role of the CDS component 130 is discussed in detail further below.

FIG. 1 further shows client 150 in communication with the HANA in-memory database appliance available from SAP AG. The client 150 includes presentation logic 152 to provide an output 154 comprising data 105 of the underlying database structure in a form desired by a user. Here, the output 154 is shown as a vertical bar chart, but of course this represents only one of a multitude of different ways in which the data may be communicated to a user. The presentation logic 152 may communicate such output in the form of HTML 156, cascading style sheets (CSS) 158, and/or JavaScript 160, or a variety of other user interface technologies.

Figure 2:
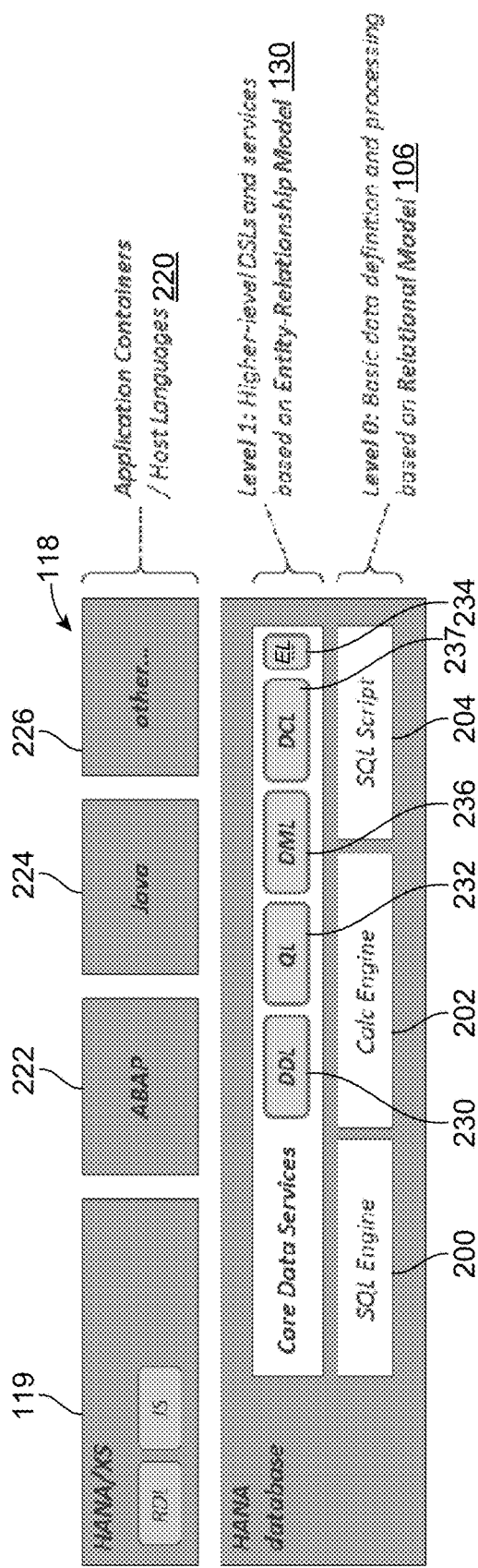
FIG. 2 shows an enlarged view of the database structure of FIG. 1.

FIG. 2 shows an enlarged view of the HANA in-memory database structure of FIG. 1. In particular, FIG. 2 shows SQL engine 200, calculation engine 202, and SQL script 204, as part of the lower layer 106 that performs basic data definition and processing based upon the relational model, according to which the data 105 of the database is organized. FIG. 2 also shows the application layer 118 of the database structure of FIG. 1, including the RDL and JS elements of a query engine 119. The application layer 118 further comprises application containers and other host languages 220, including ABAP 222, Java 224, and others 226.

FIG. 2 further shows the CDS component 130 situated between the lower layer 106 and the application layer 118. As illustrated in this figure, the CDS component 130 can be leveraged in any consuming stack variant (stack of software layers located on top of each other), as implemented through the application layer 118. Specifically, services in higher layers can use/consume the services of lower layers. Here, because the application layer sits on top of a data layer in which the CDS component 130 resides, definition and consumption of the semantically rich higher-level models is allowed.

In particular, the CDS component 130 implements higher-level Domain Specific Languages (DSLs) and services based on an entity-relationship model (ERM). The Data Definition Language (DDL) 230 is used for defining semantically rich data models, including the data types, associated metadata, and database organization (e.g., columns and tables). As mentioned throughout, according to embodiments, the DDL may be extended to further enrich these data models through the use of entities and annotations.

The Query Language (QL) 232 is used to conveniently and efficiently read data based on data models. It is also used to define views within data models. The role of the QL 232 and its relation to the DDL 230 is further illustrated in connection with FIG. 3.

The Expression Language (EL) 234 is used to specify calculated fields, default values, constraints, etc., within queries. Calculated fields, default values, and constraints may be specified as well as for elements in data models.

Other elements of the CDS component 130 can include Data Manipulation Language (DML) 236 and a Data Control Language (DCL) 237, both of which may be used to control access to data.

Figure 3:
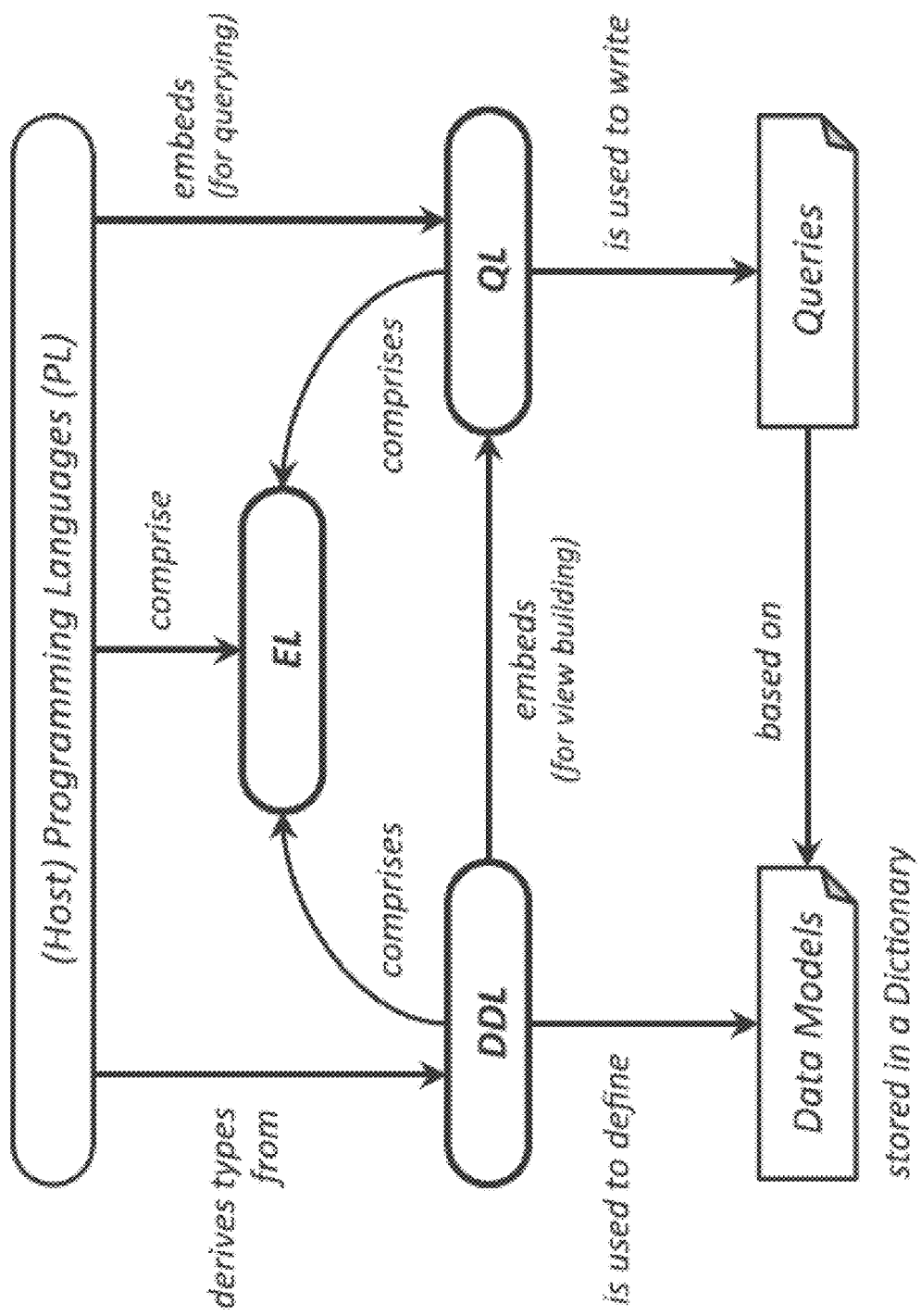
FIG. 3 illustrates relationships between individual languages making up a language family useful for interacting with a database.

Embodiments as described herein may distinguish between the domain-specific languages DDL, QL, and EL as members of a language family. This approach fosters considerations such as modular design, incremental implementation, and reuse. FIG. 3 is a simplified view illustrating relationships between these language family members. A consistent language experience across the members of the family of FIG. 3 can be achieved by ensuring the languages follow a common style. This can extend to the host programming language, with expressions in DDL, QL, and EL code adopting the same syntax. Utilization of application level domain language(s) as has been described above, can offer certain benefits. One possible benefit is that the application domain level language can avoid the use of "inefficient" and error-prone code.

Take, for example, the following simple data model describing employee information:

```
entity Employee {
    name : String(77);
    salary : Amount;   // a structured type
    orgunit : Association to OrgUnit;
        addresses : Association to Address[0..*] via entity Employee2Address;
        homeAddress = addresses[kind=home];   // introduced later on
}
entity OrgUnit {
    name : String(111);
    costcenter : String(44);
    manager: Association to Employee;
    parent: Association to OrgUnit;
}
entity Address {
    key streetAddress; key zipCode; city;   // omitted type defs
    kind : enum { home; business; }
}
```

Under some circumstances, it may be desired to write a query statement as follows:
SELECT id, name, homeAddress.zipCode FROM Employee WHERE . . . .

Within that sample snippet, path expressions along relationships are used to fetch data from an associated entity. In the simple data model above, the above query statement is equivalent to the following standard SQL statement:

```
SELECT e.id, e.name, a.zipCode FROM Employee e
LEFT OUTER JOIN Employee2Address e2a ON e2a.employee = e.id
LEFT OUTER JOIN Address a ON e2a.address = a.id AND
a.type='homeAddr'
WHERE ...
```

This statement, however, may already be too complex for many application developers. Thus, code patterns similar to that given below, may be used in some pseudo languages:

```
customers = SELECT * FROM Customer
foreach c in customers do
    write c.id
    write c.name
    addresses = SELECT * FROM Address a, $Customer2Address c2a
        WHERE a.id = c2a.address AND c2a.customer = :c.id
    foreach a in addresses do
        if a.type = 'homeAddr' then  write a.zipCode
    end
end
```

There are several issues with the code presented immediately above. One issue is the use of an imperative coding style with loops in loops, resulting in 1+n queries being executed or too much data being fetched with a SELECT * statement.

The above code represents only a relatively simple case. A more complex case is found in the following example:

```
SELECT FROM OrgUnit[boardarea='TIP'] .employees[salary
>'$100.000'] {
    addresses[kind=home].city, count(*)
}
```

The preceding cases illustrate the importance of increasing expressiveness of the languages used in application development (here, the query language). This allows the intent of application developers to be captured, rather than being buried under substantial volumes of imperative boilerplate coding.

Such expressiveness is in turn is fundamental to having optimizations applied by the query engine (in a manner analogous to functional programming vs. imperative programming). This can affect system characteristics, such as its overall performance and scalability. Further, a language's ability to allow developers to draft concise and comprehensive code, can increase developer productivity. It can also reduce the risk of mistakes and also enhance readability, and thus increase the maintainability of the code.

In order to write concise and readable query statements, it is desirable to enrich the data definitions with sufficient metadata (e.g., about associations, semantic types, etc.). Accordingly, embodiments seek to extend the DDL to define data definitions with sufficient metadata, and seek to extend the QL to leverage such definitions.

DDL and QL are declarative, domain-specific languages providing developers with concise ways to express their models and queries. Certain concepts may originate from entity-relationship modeling (ERM). By adding native support for such concepts in the underlying engine of the database, embodiments avoid the impedance mismatch induced by the translation of conceptual models based on ERM into implementations based upon a plain relational model. In particular, writing concise and comprehensive code reduces risks of mistakes and increases readability and maintainability.

Moreover, as the concepts of entity-relationship models may lie at the core of many higher-level models, embodiments are able to capture the semantics of other data models (e.g., RDL-based data models), and share those semantics with database modelers, and/or ABAP of SAP AG, or Java consumers. This reduces fragmentation and the loss of semantics. In addition, since ERM is also the chosen basis for technologies like OData EDM, embodiments can facilitate mapping entities and views to OData entity sets.

Embodiments may employ a functional approach that is based on standard SQL. In particular, the comprehensive, domain-specific nature of DDL and QL allows capturing the intent of application developers, thus avoiding a lack of clarity regarding that intent which can result from large volumes of imperative boilerplate coding. This follows the principles of functional programming and is important for optimizations.

The functional approach may be inherited from SQL. A SQL SELECT statement declares which sub-set of an overall data model is of interest as projections and selections. It may be left to the query engine to determine optimal execution, including parallelizing as appropriate.

In contrast with imperative object traversal patterns, embodiments can speed up many data retrieval use cases. While many of those retrieval cases are not individually expensive, the cumulative impact of this streamlining can have significant impacts on scalability, as it affects all requests over long periods of time.

Embodiments address some of the complexity offered by standard SQL to typical application developers by raising the basis of SQL from plain relational models to the level of conceptual models. This is done by providing native support for ERM in the database system. In this manner, the use of SQL may be reestablished for most application developers, not only for those with the SQL expertise for specific optimization tasks.

Embodiments employ associations in DDL. Specifically, the DDL allows definition of data models as entity-relationship models on a semantically rich level that is close to actual conceptual thought. To achieve this over the conventional relational model of standard SQL, certain concepts are captured by the embodiments described herein.

Figure 4:
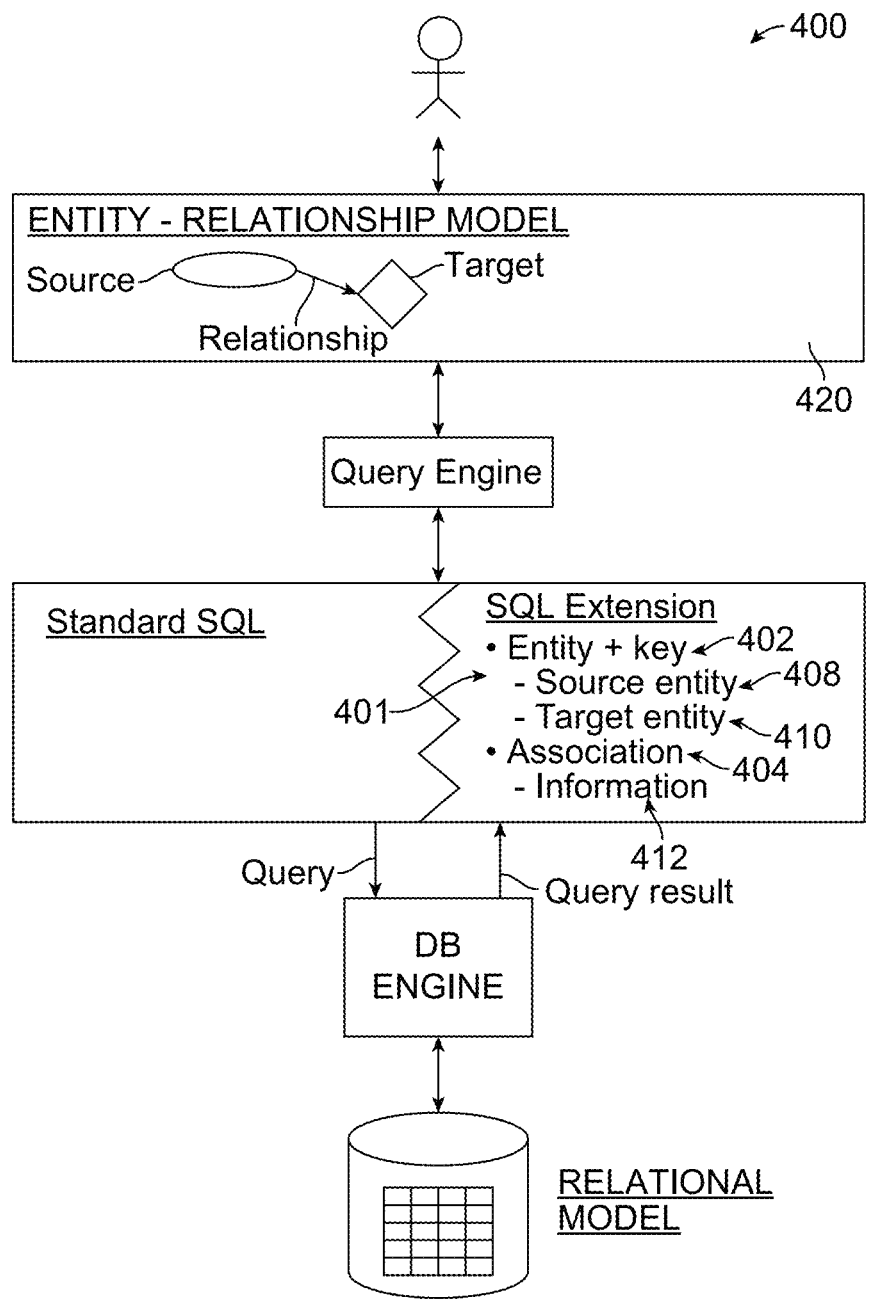
FIG. 4 is a simplified view showing an approach for extending SQL according to embodiments.

FIG. 4 is a simplified view showing an approach for extending SQL according to embodiments. As shown in the system 400 of FIG. 4, one concept underlying embodiments as described herein, is the use of entities 401 with structured types, in contrast with a conventional relational database which uses only flat tables. Entities are structured types with an underlying persistency and a unique key 402. Structured types are records of named and typed elements. An entity key is formed of a subset of the elements of the entity that uniquely identify instances. Views are entities defined by a query, which essentially defines a projection on underlying entities.

Another concept underlying entities as described herein, involves employing associations 404 on a conceptual level. This approach contrasts with the conventional use of hand-managed foreign keys. Associations define relationships between entities, and are specified by adding an element with an association type to a source entity 408 that points to a target entity 410. As shown in the FIG. 4, the relationship implemented by the association type, between source entity type and the target entity type, reflects the actual relationship between entities in the overlying ERM model 420. Using the type definition, associations may capture metadata about relationships present in the ERM in a 'reflectable' way. According to such a reflectable characteristic, a consuming portion of code receiving a piece of data from the database can get back to the type information (i.e., metadata) provided for the respective elements in the data model.

The association may be complemented by optional further information 412(e.g., regarding cardinality, which keys to use, additional filter conditions, etc.) up to a complete JOIN condition. According to embodiments, the clause-based syntax style of standard SQL may be adopted for specifying the various parameters without sacrificing readability.

In addition, the extended DDL works with custom-defined Types instead of being limited to primitive types only. The extended DDL may also add other enhancements, such as annotations, to enrich the data models with additional metadata, constrains, or calculated fields.

Figure 5:
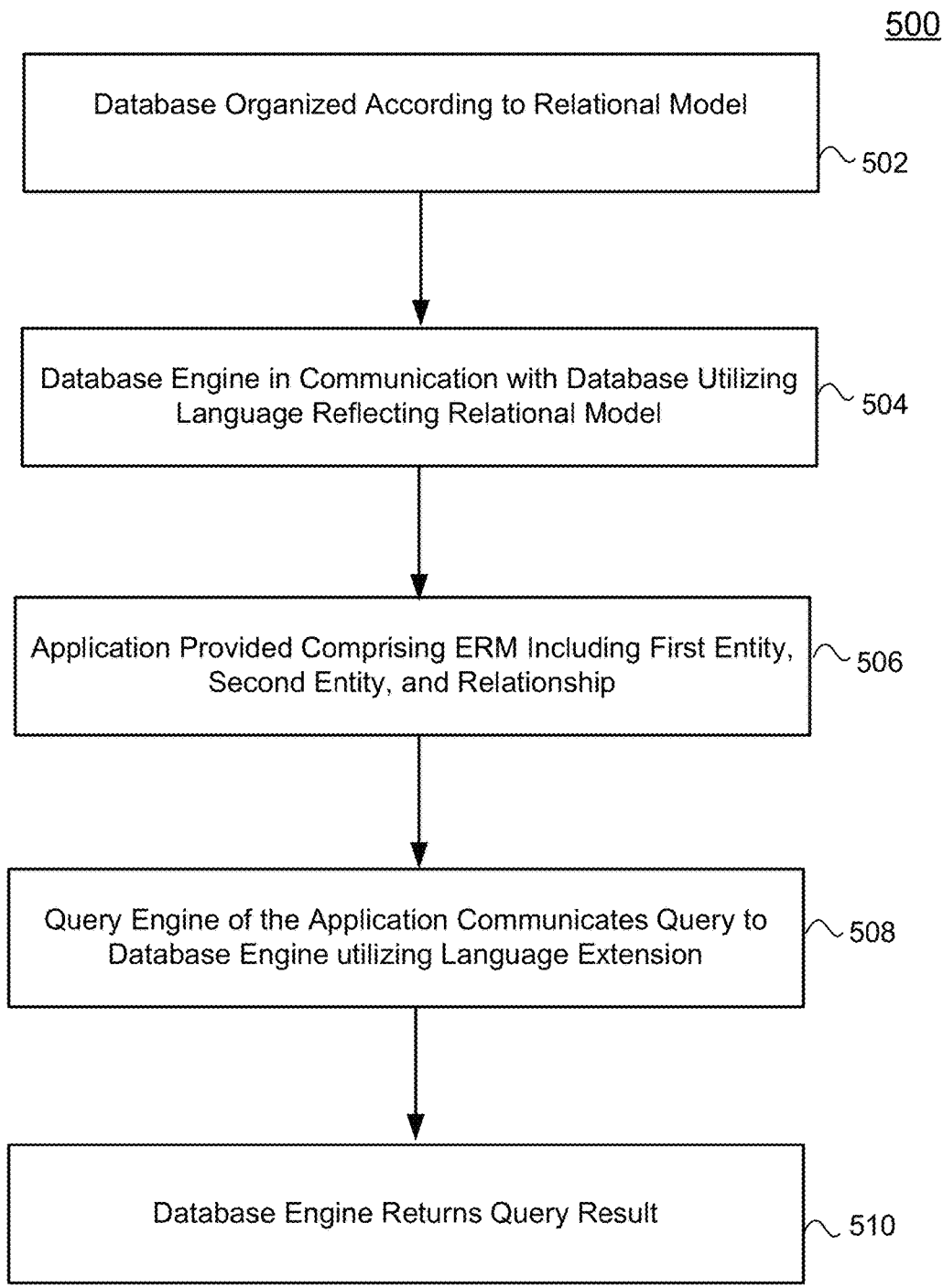
FIG. 5 is a simplified diagram illustrating a process flow according to an embodiment.

FIG. 5 is a simplified diagram illustrating a process flow 500 according to an embodiment. In a first step 502, a database is provided comprising data organized according to a relational model.

In a second step 504, a database engine is provided in communication with a database utilizing a language describing the relational model. In a third step 506, an application is provided comprising an entity-relationship model (ERM) including a first entity, a second entity, and a relationship between the first entity and the second entity.

In a fourth step 508, a query engine of the application communicates a query to the database engine utilizing a language extension providing the entity and relationship components of the ERM. The language extension may comprise a first structured entity type including a first key and indicating the first entity, a second structured entity type including a second key and indicating the second entity, and a third structured association type reflecting the relationship. The association type may be complemented with further additional information.

In a fifth step 510, the database engine returns a query result to the query engine based upon the language extension.

EXAMPLES

Some examples of extension of the SQL database language to provide entities and associations of ERMs, are now given below.

```
entity Address {
   owner : Association to Employee;     // can be used for :m associations
   streetAddress; zipCode; city;         // snippod type defs
   kind : enum { home, business };
}
entity Employee {
   addresses : Association[0..*] to Address via backlink owner;
   homeAddress = addresses[kind=home]; // → using XPath-like filter.
}
Association to Address;
Association to Address { zipCode, streetAddress };
Association [0..*] to Address via backlink owner;
Association [0..1] to Address via backlink owner where kind=home;
Association [0..*] to Address via backlink owner where zipCode
   like '76*';
Association [0..*] to Address via entity Emp2Adr;
Association [0..1] to Address via entity Emp2Adr where kind=home;
Association [0..*] to Address on owner=this;
Association [0..*] to Address on Address.owner._id = Employee._id;
Association to Address on owner=this AND kind=home;
```

For specifying syntax, embodiments may use a derivate of the Backus Naur Form (BNF) family of metasyntax notations used to express a context-free grammar, and which can be relied upon to make a formal description of a computer language. The basic constructs may be summarized as follows:

| Construct | Notation | Comments |
|---|---|---|
| definition | = | Definitions are written with a single equals sign, e.g. Rule = ... |
| extension | += | Extends a definition introduced before by additional rules |
| terminal symbol | keyword | Language keywords are set in bold red |
| terminal character | "." | Single-character language symbols are set in double quotes |
| alternation | ... \| ... | Pipe symbols separate alternatives, e.g. foo and bar \| zoo w/ car |
| grouping | ( ... ) | Parenthesis group constructs, e.g. ( foo \| bar ) with car |
| option | [ ... ] | Square brackets designate optional constructs, e.g. [ optional ] |
| repetition | ...* | 0+ repetitions are indicated by appended "*", e.g. zeroOrMore* |
| repetition | ...+ | 1+ repetitions are indicated by appended "+", e.g. oneOrMore+ |
| comment | -- ... | Comments start with a double-dash, e.g. -- this is a comment |

Syntax for SQL extended to include entities and associations as described herein, may be described as follows:

```
AssignedType += | AssociationType
AssociationType = Association [ cardinality ] ( to targetEntity ) [
   managedJoin | unmanagedJoin ]
cardinality = "[" [( maxs |* ) "," ] [min .. ] ( max|* ) "]" | "[ ]"
targetEntity = QualifiedName
managedJoin = ( forwardLink | backwardLink | mediatedLink ) [ where
   filterClause ]
   forwardLink  = "{" foreignKeys "}"
   backwardLink = via backlink reverseKeys
   mediatedLink = via entity entityName
foreignKeys = targetKeyElement [ AS alias ] [ "," foreignKeys ]
reverseKeys = targetKeyElement [ ",  " reverseKeys ]
targetKeyElement = elementName ( "." elementName )*
unmanagedJoin  = on filterClause
```

From DDL perspective, association is a new primitive type that is specified with the type name Association, followed by several parameter clauses to specify requisite metadata. These parameter clauses are as follows:

Cardinality allows specifying the relationship's cardinality in the form of [min . . . max], with max=* denoting infinity and "[ ]" as a shorthand for [0 . . . *]. As a default, if omitted [0 . . . 1] is used as the default cardinality. An example is:

Association[ ] to Address via backlink owner;

To targetEntity specifies the association's target entity. A qualified name is expected, referring to another entity (incl. views). Specifying the target is mandatory—there is no default.

{foreignKeys} allows specifying a combination of alternative key elements in the target entity, to be used to establish the foreign key relationship. Where a key element is in a substructure on the target side, an alias name is to be specified. Further details are provided below regarding associations represented as foreign key relationships.

If omitted, the target entity's designated primary key elements are used. The following are examples:

```
Association to Address { zipCode, streetAddress };
Association to Address { some.nested.key AS snk };
```

Another parameter clause is VIA backlink: reverseKeys. For 1:m associations, it is mandatory to specify target elements, which are expected to be a key combination matching the source's primary keys or an association referring to the source entity. An example is:

Association to Address via backlink owner;

Another parameter clause is VIA entity: entityName. For m:m associations, it is mandatory to specify a link table's entity name. That name can either refer to a defined entity or a new entity will be created as follows:

```
entity <entityName> {
   <nameOfSourceEntity> : Association to <SourceEntity>;
   <nameOfTargetEntity> : Association to <TargetEntity>;
}
```

If the data model contains an explicit definition of the link table entity, that entity must adhere to the template shown above. It can, in addition, add other elements. An example is given below:

```
Association to Address via entity Employee2Address;
entity Employee2Address {
   employee : Association to Employee;
   address : Association to Address;
}
```

The WHERE filterClause allows specifying additional filter conditions that are to be combined with the JOIN conditions. This can be especially relevant in combination with VIA backlink or entity clauses. Depending on the filterCondition this can reduce a base :m relationship to one with a :1 cardinality. An example is given below:

Association to Address[0 . . . 1] via backlink owner where kind=home;

The ON filterClause allows fully specifying an arbitrary join condition, which can be any standard SQL filter expression. Using this option results in the respective association being user-managed. That is, no foreign key elements/fields are created automatically. The developer is expected to explicitly manage the foreign key elements, including filling them with appropriate foreign key values in write scenarios. An example is given below:

Association to Address on owner=this;

Element names showing up in VIA, WHERE, and ON clauses, are resolved within the scope of the target entity's type structure. Siblings can be referred to by prefixing an element with a ".". Elements from the scope above can be referred to by prefixing an element with " . . . ", etc.

In addition, the outer entity's top-level scope can be referred through the pseudo variable "this", which is described further below in connection with Pseudo Variables in QL.

According to embodiments, associations are represented as foreign key relationships. In the relational model, associations are mapped to foreign key relationships. The foreign key elements are usually created automatically as described in the following sections. In particular, an element with association type is represented as a nested structure type containing foreign key elements corresponding to the target entity's primary key elements—i.e. having the same names and types. The following are examples of definitions which may be given:

```
entity Employee { ...
address1    : Association to Address;
address2    : Association to Address { zipCode, streetAddress };
addresses   : Association to Address[0..*] via backlink owner;
}
```

In this example, the association elements would implicitly be defined with a nested structure type containing foreign key elements in the :1 cases (plus additional metadata about the association) as follows:

```
entity Employee { ...
address1 {
  _ID           : type of Address._ID;
}
address2 {
  zipCode       : type of Address.zipCode;
  streetAddress : type of Address.streetAddress;
}
addresses { /* none at all since :m */ }
}
```

Following the rules for mapping structured types to the relational model as specified above, the underlying table would be created:

```
CREATE TABLE Employee ( ...
"address1._ID"         Integer,
"address2.zipCode"     String(...),
"address2.streedAddress"  String (...)
)
```

Rules for representing associations in the persistence model may apply, as indicated in the table below:

| If . . . is specified | for to-one cases, e.g. [0 . . . 1] | for to-many cases |
|---|---|---|
| <no join clause> | Nested foreign key elements are created for target's primary key elements. | not allowed |
| {foreignKeys} | Nested foreign key elements are created for the elements specified in foreignKeys. | |
| VIA backlink reverseKeys | No nested foreign keys are created; instead the reverseKeys are expected to link back from target to source. | |
| VIA entity entityName | No nested foreign keys are created; instead the link table named entityName is created/used as described above. | |
| ON joinCondition | No nested foreign key elements are created; managing the foreign key relationship is completely up to the developer. | |

Consistent with the approach in SQL, no plausibility checks are enforced (e.g., checking whether target key elements specified in {foreignKeys} fulfill the uniqueness requirements). Also, no implicit referential integrity checks are enforced at runtime.

According to embodiments, associations may be in custom-defined types. As associations are special types, they can principally be defined not only for elements in entity definitions, but in type definitions in general. For example, the following definition of the association Amount.currency is valid DDL content:

```
entity Currency {           // List of pre-defined Currencies
    key code : String(3);
    description : String(33);
}
type Amount {
    value : Decimal(10,2);
    currency : Association to Currency;
}
```

An actual relationship between entities is established when using the type Amount for an element within an entity definition, as in:

```
entity Employee {
    salary : Amount;
    address : Association to Address;
}
```

The code shown above essentially indicates that the entity Employee has two associations—one association is to Address and another association is to Currency within its salary element.

Associations in custom-defined types may only be supported for a simple "to-one" relationship with a foreign key on the source side. That is, associations with via backlink or via entity clauses may not be supported for elements in custom-defined types.

Associations in Query Language (QL) are now discussed.

Querying Associations with :m Cardinality

Resolving associations or compositions with 1:m cardinality using path expressions or nested projection clauses with the flattening operator "." in place results in flat result sets with duplicate entries for the 1: side, which is in line with standard SQL JOINs and the relational model.

As examples, in the following queries, "addresses" refers to an association with "to-many" cardinality [0 . . . *]:

```
SELECT name, addresses.city FROM Employee;
```

```
SELECT name, addresses.{ zipCode, city } FROM Employee;
```

The result sets for the example queries above, are shown below, each with the same value for name repeated/duplicated for each found entry on the :m Address side:

```
<Result Set 1> { name, city }
<Result Set 2> { name, zipCode, city }
```

Embodiments also allow the return of 'Deep' Result Sets. Specifically, in addition to the standard flattening behavior, the introduction of nested projection clauses and structured result sets principally allows expression of 'deep' queries along :m associations. These deep queries return 'real deep' result sets having the 1: sides elements on a top level, with nested tables/sets for the :m sides.

For example, the deep query:
SELECT name, addresses {zipCode, city} FROM Employee;
would be expected to return a result set with a nested collection as shown below:

```
<Result Set> {
    name,
    addresses : <collection of> Address { zipCode, city }
}
```

Such deep querying may provide certain benefits. One possible benefit is to allow retrieving larger structures through a single query.

Currently, in the absence of deep querying, such larger structures may frequently be obtained in a brute-force approach, through 1+n queries with n being the number of records returned by a 1: side query. This is detrimental to performance, particularly if such a query spans several levels of to-many associations.

While the other extensions can be realized by translating to standard SQL queries, this one requires adding special support deep within the query engine. The absence of such support may preclude using to-many associations in the non-flattened way. This is discussed further below in the associations of FROM clauses, regarding how association trees can be traversed.

Associations in WHERE Clauses

Associations can arise not only in projection clauses but also in filter conditions in WHERE clauses. Respective comparison operators may be enhanced to support associations, as depicted in the following examples:

1. SELECT ... from Emloyee WHERE orgunit={ _id : '4711' };

2. SELECT ... from Emloyee WHERE homeAddress={ zipCode: '76149', streetAddress: 'Vermontring 2'

};

3. SELECT ... from Emloyee WHERE orgunit='4711';

4. SELECT ... from Emloyee WHERE homeAddress.city like 'Wall%';

5. SELECT ... from Emloyee WHERE homeAddress.city IN ( 'Walldorf', ...
);

```
    6. SELECT ... from Emloyee WHERE address IS NULL;
    7. SELECT ... from Emloyee WHERE address[kind=home].city =
'Walldorf';
    8. SELECT ... from Emloyee WHERE homeAddress =
addresses[kind=home];
```

Several issues arising within the examples immediately above, may be worthy of note. In connection with:
ad 1,2: A record literal can be passed to a comparison with an association, with elements that match the combination of the foreign keys.
ad 3: Support for Association type in QL includes automatic coercions of typed scalars or string representations thereof to single-key associations.
ad 4: One can also refer to the individual key values using standard path expressions.
    ad 5ff: Other SQL comparison operators can be used, such as LIKE, IN, IS NULL, . . . .
ad 8: It can be combined with XPath-like filter expressions.
ad 9: It can be combined with compare associations, provided they are assignable.
The above provides just a few examples to give the idea. In general, every condition that is possible with standard SQL expressions shall be possible to do with associations as well, including sub queries with exists and not exists, etc.

Associations in FROM Clauses

Embodiments may also allow associations in FROM clauses. Specifically, host languages may provide support for representing associations as typed variables or elements. This is described below in connection with association types in host languages.

Accordingly, one can traverse along associations, as shown in the following examples (in some pseudo language):

```
var daniel = SELECT name, homeAddress FROM Employee WHERE
name='Daniel';
// ... and somewhat later, maybe at some other place in an
application...
var addresses = SELECT * FROM Address WHERE
this=daniel.homeAddress;
```

The expression this=<an association> can be used. The comparison this=<an association> can be retrieve an entity by a given association. The pseudo variable this is always an alias for the entity given in the FROM clause. Therefore, the statement above actually resolves to:
    SELECT * FROM Address this WHERE this=daniel.homeAddress;
The comparison this=<an association> compares a queried entity with a given association—the association must be of type Association to <queried entity> [ . . . ]. This expands to a WHERE clause corresponding to the ON condition resolved from the association. In this case it would actually resolve to:

```
SELECT * FROM Address this
    WHERE this.zipCode = daniel.homeAddress.zipCode
        AND this.streetAddress = daniel.homeAddress.streetAddress
        AND this.type = 'home';
```

Embodiments may also allow the use of SELECT from association. Specifically, association-traversal code patterns like the one below are frequently seen:

SELECT * from Address WHERE this=daniel.homeAddress;

An association in general, and a programming language variable with association type support in particular, carries all information about a target record—essentially providing information as to which entity goes with which key. Thus equivalent to the query above, embodiments allow the shorthand below for traversing associations:
    SELECT * from daniel.homeAddress;
In general, a query statement of the form SELECT . . . from <someAssociation> expands to:

```
SELECT ... from <someAssociation>.<targetEntity> WHERE
    this=<someAssociation>;
```

Here, <targetEntity> signifies the metadata associated with the association corresponding to the target entity specified in the association's declaration using the ON targetEntity clause.

JOINs Declare Ad-Hoc Associations

Embodiments allow JOINs to declare ad-hoc associations. In the case of a missing association, the standard JOIN <target> ON <join condition> clauses as introduced in SQL-92 are still supported, which align with the extensions introduced above, as they naturally introduce associations in an ad-hoc fashion.

For example, in the data model given above, the entity Employee has an association homeAddress, but is lacking a similar association for businessAddress, which can be compensated for using a standard JOIN clause as follows:

```
SELECT FROM Employee e
    ASSOCIATION TO Employee2Address e2a ON
        e2a.employee = e
    ASSOCIATION TO Address businessAddress ON __id =
        e2a.address.__id
    AND kind=business
    {
    ID, name,
    businessAddress { streetAddress, zipCode, city }
    }
```

The expression may follow the syntax below:

```
JoinClause += | JOIN targetEntity [[AS] Identifier ]
    JoinConditionClauses
```

Other syntax is as discussed above in connection with associations in DDL.

JOIN clauses fit easily into the extensions in DDL and QL. JOIN clauses can be interpreted as an ad-hoc definition of missing associations.

In the example immediately above, the association businessAddress is added. This result is recognized if the projection clause of the example above, is compared to that of the query applied to the domain model if the association were in place (below):

```
SELECT FROM Employee {
    ID, name,
    businessAddress { streetAddress, zipCode, city }
}
```

Embodiments also allow the use of simplified JOIN clauses. In particular, following the observation that JOINs essentially declare ad-hoc associations, embodiments JOINs to be declared using the same clauses that are used to declare associations in DDL. Given this, the above example can be written more easily as follows:

```
SELECT FROM Employee e
    ASSOCIATION TO Address businessAddress VIA entity
    Employee2Address
    WHERE kind=business
{
ID, name,
businessAddress { streetAddress, zipCode, city }
}
```

CDS Extensibility

Figure 6:
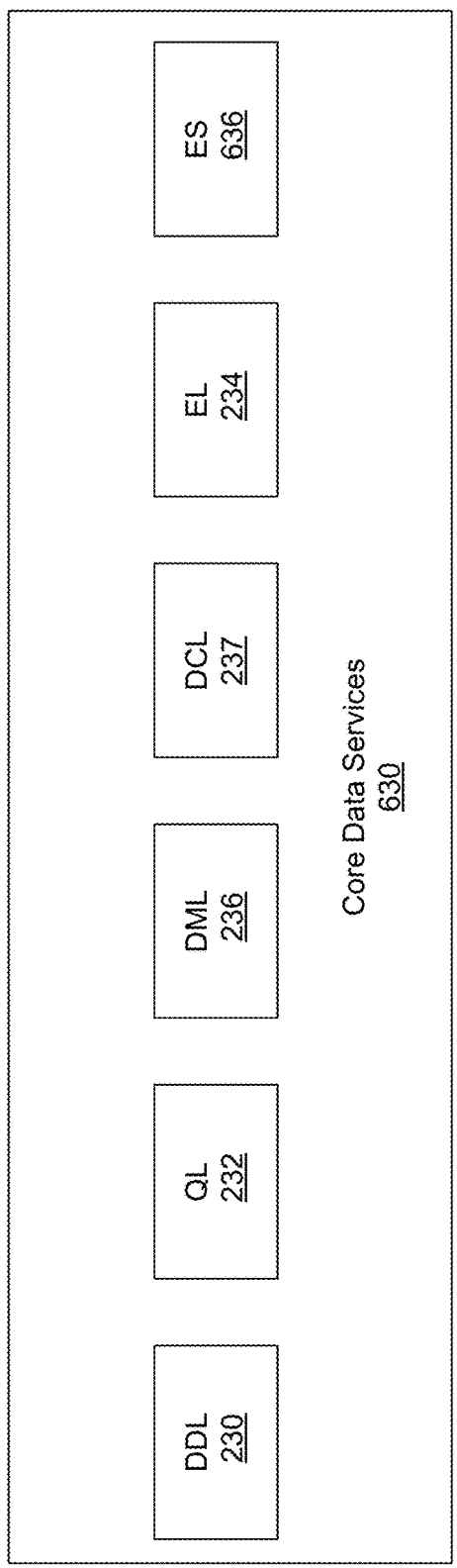
FIG. 6 shows an enlarged view of the core data services of the database structure of FIG. 2 according to embodiments.

FIG. 6 shows a CDS component 630 that may be used as an alternative to the CDS component 130. The CDS component 630 includes the DDL 230, the QL 232, the EL 234, the DML 236, the DCL 237, and an extensibility support (ES) 636. ES 636 allows a user to add structural extensions to relational model to simplify generating data models and queries. The structural extensions may also be used to associate tables generated by two different entities, such as a database provider and a customer. The structural extensions may also be used to generate views from projections of the data model. The structural extensions are done using extension language.

Figure 7:
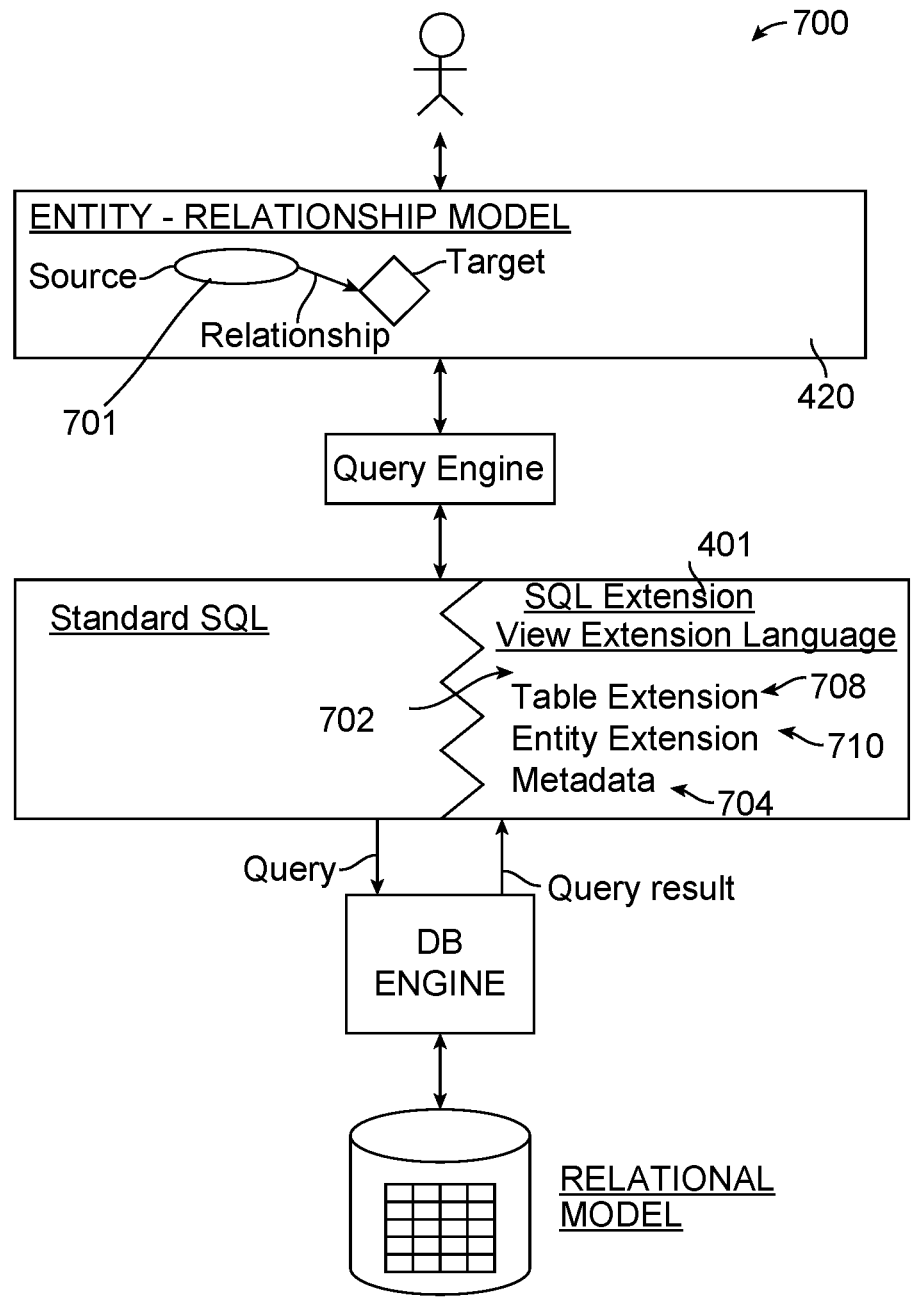
FIG. 7 is a simplified view showing an approach for extension language according to embodiments.

FIG. 7 is a simplified view showing an approach for extension language according to embodiments. As shown in the system 700 of FIG. 7, one concept underlying embodiments as described herein, is the use of entities 701 with structured types. Entities 701 comprise entities 401 described above and further comprise extension language 702. ES 636 allows users to add extension language 702 to tables in the relational model on top of or in addition to the existing syntax, such as SQL. Metadata 704 may be used for extension language that use annotations, associations, semantic types, and other metadata described herein.

ES 636 may also append a table extension 708 to associate a table of the data model to another table of the data model. ES 636 may also append an entity extension 710 to associate an entity of the data model to another entity of the data model.

Figure 8:
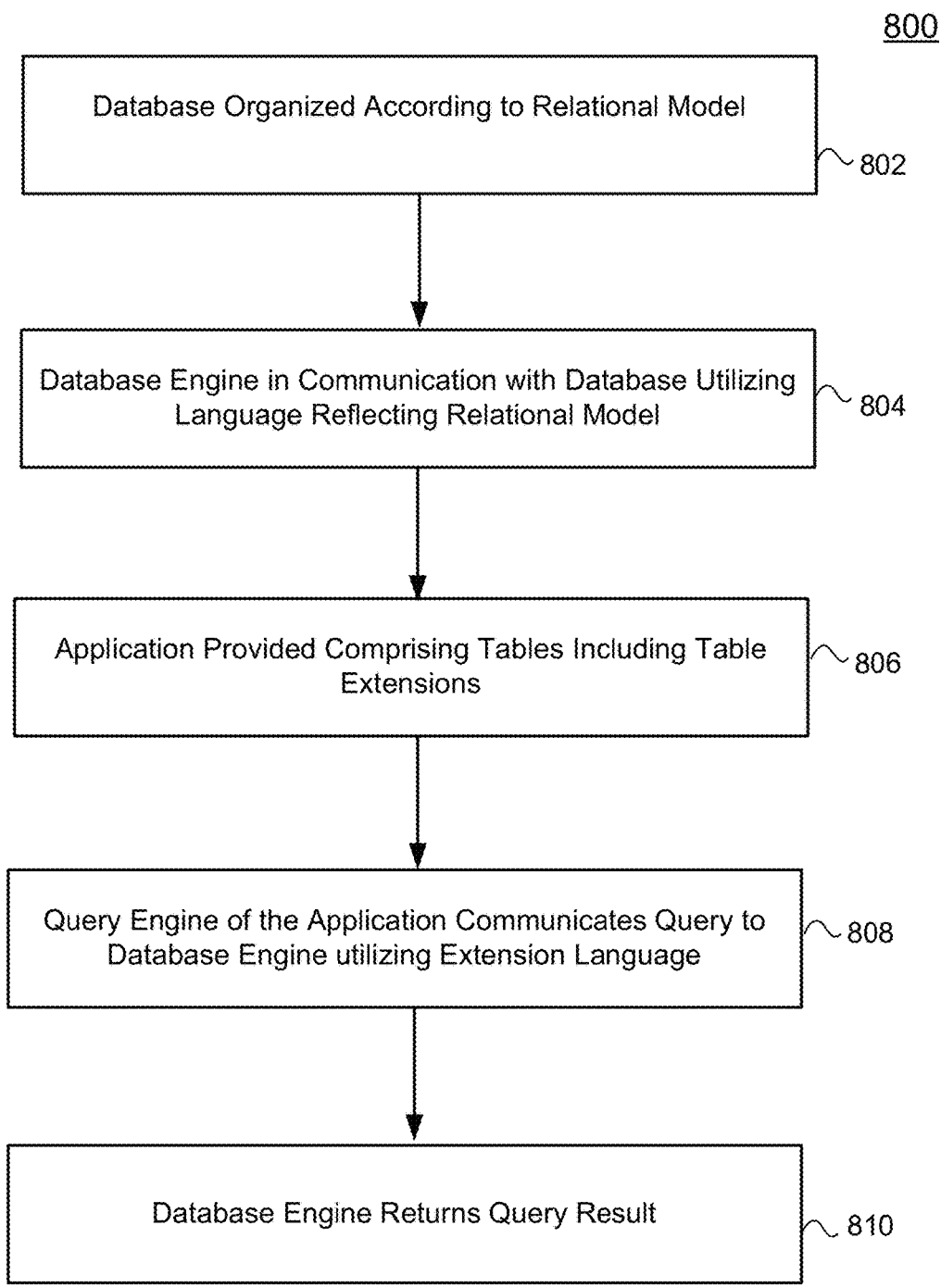
FIG. 8 is a simplified diagram illustrating a process flow for a query using extension language according to an embodiment.

FIG. 8 is a simplified diagram illustrating a process flow 800 for a query using extension language according to an embodiment. In a first step 802, a database is provided comprising data organized according to a relational model.

In a second step 804, a database engine is provided in communication with a database utilizing a language describing the relational model. In a third step 806, an application comprising a database model including at least one table is provided. Each table includes at least one table extension.

In a fourth step 808, a query engine of the application communicates a query to the database engine utilizing an extension language accommodating the database model. The extension language comprises an indicator to include in the query all active elements for each table extension that is active.

In a fifth step 810, the database engine returns a query result to the query engine based upon the extension language.

The following describes various examples of ES 636 and operations of the CDS component 630.

View Generation Automatically Includes Customer-Fields or Elements into Projection List In this situation, a developer wants to foresee in the definition of his view that the projection list should automatically be extended by the elements or fields that the customer has added (e.g., via APPENDs) to the underlying entities or tables, respectively, of the database provider. The customer does not need to explicitly extend the view in case he wants to have his field-/element-extensions in the projection list of the view.

The syntax of the CDS component 630 to support this scenario may use an extension language to indicate in the projection list that all elements in all active table-extensions or entity-extensions should automatically be included. In some embodiments, the extension language indication in the projection list also allows specifying only a subset of all active table extensions or entity extensions to be included in the projection list (e.g., only extensions of industry "Oil & Gas").

According to embodiments, the extension is a pseudo variable $extensions to indicate that extension fields should be included without specifying the concrete names of the concrete extension fields. The concrete syntax is as follows:

[<table_alias>"."]$extensions.*

Two usage scenarios are described below:

First, to include all active extension fields of all the underlying table(s) or entities being used within the CDS-View-Definition, the following statement may be written:

$extensions.*

Second, to selectively include the active extension fields only from some of the underlying table(s) or entities being used within the CDS-View-Definition, the following statement may be written:

<table_alias>.$extensions.*

According to embodiments, the CDS component 630 need not use specific language enhancements to filter the extensions based on dedicated "extension contexts" (e.g., Industry "Retail"). This context-specific handling of the extensions may be processed via a repository or dictionary (during the activation of the extensions) based on dedicated metadata, such as metadata 704. This may be implemented as described below in conjunction with excursus and context-specific extensions.

According to embodiments, when accessing these extension fields afterwards (e.g., within a SELECT-statement), the extension fields can be directly accessed via their names without specifying pseudo variable $extensions.

Example 1

The following example provides a view of employees with ID, name, salary, and address by using extensions for all active extension fields of all underlying tables or entities:

```
view EmployeesView as SELECT from Employee {
    ID, name,
    salary,      // returns nested structure
    address,     // retains the association as itself
```

```
    $extensions.*    // includes all active extension fields of all
                        underlying
                     // tables/entities
}
```

When accessing the result of the view, the extension fields can by directly accessed via their names (without needing to specify $extensions as prefix):

```
SELECT ID, name, customerExtension1, customerExtension2 FROM
EmployeesView ...
```

Example 2

The following example provides an example selective inclusion of extension fields from multiple tables/entities:

```
view EmployeesView as SELECT from EMPL_TAB AS Employee
        LEFT OUTER JOIN Employee2Address AS e2a ON
            e2a.employee =
        Employee.id
            LEFT OUTER JOIN ADDR_TAB AS Address ON
            e2a.address = Address
{
        Employee.ID,
        Employee.EMPL_NAME as name,
        Employee.$extensions.*,
        Address.ORT as city,
        Address.STRASSE as street
        Address.$extensions.*,
}
```

Extension of Underlying Entities and Tables

A prerequisite for referring to extension fields within a view definition is that these fields have been added as extensions to the underlying tables or entities. The main scenarios for referring to extension fields are the following two:

First, the tables are existing ERP or ABAP tables being created in a data dictionary (DDIC). These tables have been extended (and will also in the future be extended) via the DDIC APPEND mechanism. In other words, all the fields being defined within these DDIC APPENDs can be referenced within the CDS-View Definition of the CDS component 630.

Second, the extensions have been defined on CDS-Entity level of the CDS component 630. This may happen via the keyword extend. The concrete syntax and the impact of this extend keyword is described in more detail below.

EXAMPLE

This example provides an extension for a defined entity by a customer "acme":

```
namespace apme.orgmgmt;
extend entity sap.orgmgmt::Employee {
    acmeFlags : String(3) enum { x1; x2; };
}
```

Customer Extends the Projection List of a Database Provider View

In this situation, a customer extends the projection list of a defined semantic types either by further defined elements or by his own elements that he has added as customer extensions to the underlying entities or tables. According to embodiments, this enrichment of the projection list is done in a "modification-free" way so that the customer extensions are not impacted by future versions of the pre-defined view of a database provider.

According to embodiments, the extension support also allows the "chaining of extensions." For example, a standard ERP solution is extend by a database software developer industry solution that is again extended by a customer to form a chain of extensions.

The syntax of the CDS component 630 to support this scenario may use an extension language allows specifying extensions as deltas to the extended artifacts and that merges these extensions into the extended artifact during activation/runtime.

According to embodiments, to indicate these extensions, the extension language uses a dedicated statement/keyword that allows extending the underlying artifact (e.g., a pre-defined view). In some embodiments, the keyword extend is added in front of existing language constructs to define views, entities, types, and the like.

Using that keyword extend indicates that the whole definition of the subsequently referenced artifact (e.g., a View "Employee") is reused and only that kind of metadata needs to be specified explicitly that should be added to the definition of the underlying artifact.

The syntax of the CDS component 630 to support this extension is for example:

extend view <name_of_view_to_be_extended> [as <extensionAlias>] { . . . }

In addition to view, other CDS main artifacts of the CDS component 630 can be extended, like entity, type or annotation.

An extension via the keyword extend has mainly two effects. First, during activation of the extension, the runtime object of the underlying "base artifact" (e.g., the first one within an extension chain) is automatically enriched with the defined extensions. Existing application code that directly accesses this "base artifact" implicitly gets the extended data without any changes to the coding.

Second, in addition to enrichment of the underlying "base artifact," a specific name identifying the extension is generated based on the following rules:

- In case the extend-statement is used without "as <extensionAlias>":
  <qName> =
  <namespace_of_extension>"::"<localName_of_base_artifact>
- In case the extend-statement is used with "as <extensionAlias>":
  <qName> =
  <namespace_of_extension>"::"<extensionAlias>

The specific name is used twofold. First, the specific name defines the name of the extension artifact (which manages only the additional metadata explicitly defined within the extension). This name can be used by the platform-specific design-time environment to create the corresponding development object for managing the extensions during design-time (e.g., Software Logistics, Activation).

Second, the specific name acts as an alias to access the extended artifact which contains both the metadata of the base artifact and all the additionally defined extensions. This implicitly created alias is equivalent the following statement:

```
view<namespace_of_extension>"::"<localName_of_base_artifact>
    as alias to <qName_of_base_artifact>
```

Second, this alias can subsequently be used within the DDL 230 to explicitly indicate to the DDL 230 compiler that not only the base artifact but also the extensions should be in scope of the DDL 230 statement. Potential usages are for example extension chains or defining completely new artifacts on top of an extended artifact (examples are described below).

Consequently, new application code can access the "base artifact" including the extensions both via specifying the qualified name (QName) of the "base artifact" or by specifying the newly created alias.

For views, the extension of the projection list extends the projection list by adding new elements. These elements are either database provider-defined elements of the underlying table or entity or customer-defined elements being part of a table/entity extension.

The syntax of the CDS component 630 to support this extension is for example:

```
extend view <name_of_view_to_be_extended> [as
<extensionAlias>] {
    <name_of_new_element> [AS element_name_in_view], ...
}
```

The newly added elements are elements being defined within the underlying entity or table (either directly via the database provider or within a table or entity extension).

For views, the extension of the projection list may enrich a predefined element in projection list (e.g., add new sub-element to a structured element or add new annotations to an existing element). These kinds of enrichments are pure extensions, meaning they must not change the definition or behavior of the underlying element in an incompatible way.

The syntax of the CDS component 630 to support this extension is for example:

```
extend view <name_of_view_to_be_extended> [as
<extensionAlias>] {
        extend <name_of_element_to_be_extended> ...
}
```

Example 1

The following is an example of a database provider that defines a view:

```
// SAP-defined View:
namespace sap.orgmgmt;
view EmployeesView as SELECT from Employee {
    ID, name,
    salary,          // returns nested structure
    address,         // returns the association as itself
    {                // resolves :1 association and creates a
    structured type
        manager,
        name as orgunitName,
    } as orgunit
}
```

The following is an example of a customer that extends the view of the database provider:

```
// Extension of SAP-defined View by customer "acme":
namespace acme.orgmgmt;
@EndUserText.Label: 'Extended Employee View' //adds a new label to
the view
extend view sap.orgmgmt::EmployeesView {
    // A new customer-defined field is added:
    acmeFlags,
    // the SAP-defined element "name" is extended with a new label
    text:
    @EndUserText.Label: 'Name of Employee'
    extend name,
    // SAP-defined structure "orgunit" is extended by the SAP-defined
    field "costcenter":
    extend orgunit { costcenter }
}
```

The extend view statement leads on the one hand to the enrichment of the runtime object of the "base artifact" sap.orgmgmt::EmployeesView with the extension elements. On the other hand, the statement leads to the creation of the name acme.orgmgmt::EmployeesView which acts both as the name of the extension artifact and as an alias for the extended view allowing access to the "base artifact" together with all the extensions. This alias is equivalent to the effect of the following statement:

view acme.orgmgmt::EmployeesView as alias to sap.orgmgmt::EmployeesView

Using this alias in subsequent DDL 230 statements allows for a typed access to the extension fields as it allows the DDL 230 compiler to uniquely identify that the extended artifact is referenced. The following example illustrates this difference:

By using the generated alias, the following statement to access the extensions in a typed manner is allowed:

```
view newView as select from acme.orgmgmt::EmployeesView
    { acmeFlags, ...}
```

When using the name of the base artifact, the extensions can be accessed in a generic way. So the following statements are allowed in this case:

```
view newView as select from sap.orgmgmt::EmployeesView
    $extensions.*, ...}
```

Example 2

The following is an example of a customer that extends the view of the database provider and uses an explicit alias for the extension name:

```
// Extension of SAP-defined View by customer "acme":
namespace acme.orgmgmt;
extend view sap.orgmgmt::EmployeesView as EmployeesViewExtension {
    // A new customer-defined field is added:
    acmeFlags,
    // the SAP-defined element "name" is extended with a new label
    text:
    extend name @EndUserText.Label: 'Name of Employee',
    // SAP-defined structure "orgunit" is extended by the SAP-defined
    field "costcenter":
    extend orgunit { costcenter }
}
```

In this case the generated name for the extension object and the alias to the extended view would be acme.orgmgmt::EmployeesViewExtension and not ac-me.orgmgmt::EmployeesView as in the example 1 above.

Example 3

As described above, extensions can be chained. For example, a partner may extend the view of a database provider, and a customer of the partner may extend the view of the partner. The following is an example of chaining of extensions where the partner "apme" extends a core database provider view and the customer "acme" extends the partner solution:

```
// SAP-defined View:
namespace sap.orgmgmt;
view EmployeesView as SELECT from Employee {
    ID, name,
    salary,          // returns nested structure
    address,         // returns the association as itself
    {                // resolves :1 association and creates a structured type
        manager,
        name as orgunitName,
    } as orgunit
}
// Extension of SAP-defined View by partner "apme":
namespace apme.orgmgmt;
extend view sap.orgmgmt::EmployeesView {
    // A new partner-defined field is added:
    apmeFlags,
}
// Extension of partner solution by customer "acme":
namespace acme.orgmgmt;
extend view apme.orgmgmt::EmployeesView {
    // A new customer-defined field is added:
    acmeFlags,
    // the partner-defined element "apmeFlags" is
    extended:
    extend apmeFlags @EndUserText.Label: 'These are
    new flags',
    // SAP-defined structure "orgunit" is extended by the
    SAP-defined
    field "costcenter":
    extend orgunit { costcenter }
}
```

Based on this example, the underlying "base artifact" is enriched with both the partner- and customer extensions. In addition, the two aliases apme.orgmgmt::EmployeesView and acme.orgmgmt::EmployeesView are created.

Context-Specific Extensions

In case the extensions should be relevant only for dedicated extension contexts (there could be multiple dimensions of such contexts), the corresponding extensions is annotated. This annotation at the extension specifies the context in which the extension is relevant. If there is no context defined, the extension is generally relevant.

The provisioning or definition of the extension context uses an @ExtensionContext annotation that defines the context dimensions and its values:

```
@Scope [CONTEXT, ENTITY, VIEW, TYPE]
annotation ExtensionContext [ ] {
    dimension : String enum {PROCESS; INDUSTRY; COUNTRY;
PRODUCT; GEOPOLITICAL;
                LEGAL; ROLE; ...};
    value [ ] : String;
}
```

This annotation can be used at extensions to define the context in which the extension is relevant.

Example

The following is an example of an annotation extension of a partner extension by a customer of the partner in a chaining of extensions:

```
// Extension of partner solution by customer "acme"::
namespace acme.orgmgmt;
@ExensionContext { dimension: INDUSTRY, value: 'Retail' }
extend view apme.orgmgmt::EmployeesView {
    // A new customer-defined field is added:
    acmeFlags,
    // the partner-defined element "apmeFlags" is extended:
    extend apmeFlags @EndUserText.Label: 'These are new flags',
    // SAP-defined structure "orgunit" is extended by the SAP-defined
    field "costcenter":
    extend orgunit { costcenter }
}
```

The consumption of the extension context can happen in several places.

The annotation of the extension context may be considered by the repository or directory when activating extensions for system 100. Based on the configuration, the system 100 is configured with settings for certain dimensions of the context. Depending on this, the extensions that are activated correspond to the system setup comparing the extension contexts and system configuration.

For the case that the system 100 is configured for multiple values of one dimension, but a certain view shall only consider elements of one dimension or a certain value of a dimension, a filtering option on the view definition is provided. For this purpose, a second annotation @ExtensionFilter is applied:

```
@Scope [CONTEXT, ENTITY, VIEW, TYPE]
annotation ExtensionFilter [ ] {
    dimension : String enum {INDUSTRY; COUNTRY; ...};
    value [ ] : String;
}
```

Example for Using the Filter at a View:
The following is an example of using an extension filter at a view:

```
// SAP-defined View:
namespace sap.orgmgmt;
@ExtensionFilter { dimension: INDUSTRY, value: 'Retail' }
    view EmployeesView as SELECT from Employee {
        ID, name,
        salary,              // returns nested structure
        address,             // returns the association as itself
        $extensions.*        @ExtensionFilter { dimension:
                             INDUSTRY, value: 'Retail' }
                             // includes all active extension fields
                             filtered by Industry
                             // 'retail' by preserving their structuring
    }
```

The annotation can be written either in front of the view or at the element $extensions. Both variants have the same meaning since also with the definition of the view, the filter is bound to the extension elements placeholder.

Customer Extends a Database Provider-View by Joining a Customer-Entity or Table into the Database Provider-View In this situation, the customer has extended the database provider-defined application persistency by not adding own extension fields to the database provider entity or table but by creating an own customer entity or table which contains the customer-specific fields. Consequently, he wants to extend the database provider view by adding fields from the customer entity or table to the projection list of the database provider view.

The syntax of the CDS component 130 to support this scenario may leverage associations of CDS component 130. Instead of allowing or forcing the customer to extend the database provider view by extending the FROM-clause and by adding new JOIN-Conditions, the customer can extend the underlying table/entity of the database provider view by a new association to the customer table or entity. The customer further may the projection list of the database provider view by using the new association to add fields from the customer table or entity to the projection list.

This approach may impede the customer from change the database provider view in an in-compatible way, which could have happened in case he would be allowed to directly edit the JOIN-conditions in the database provider view.

To support this scenario, the CDS component 630 exposes existing tables as entities. In some embodiments, this step is optional in case the table is exposed (respectively consumed) 1:1 as an entity. On the other hand, this step is mandatory in case certain transformations should take place during the exposure as an entity (e.g. renaming of table- or element names, adding of associations . . . ).

The syntax of the CDS component 630 to support this scenario may use an entity extension, which is described above as follows:

entity <entity_name> as SELECT from <table_name> { . . . };

To support this scenario, the CDS component 630 extends entities and views, which is described above. The syntax of the CDS component 630 to support this scenario may use an extend entity extension as follows:

extend entity <entity_name> { . . . }/extend view <view_name> { . . . }

Example

The following is an example of a customer extending a database provider view by joining a customer-entity or table into the database provider view:

```
// Extension of SAP-defined View by customer "acme":
namespace acme.orgmgmt;
// First the customer exposes the table he wants to include into the
view as an entity. In
// this case the step is mandatory as the name of the entity differs
from the table name.
entity EmployeeDetails as view on EMP_DETAIL_TABLE { * };
// Second he extends the SAP-table (which is the basis of the View)
by a new assocation to // the customer entity (table)
extend entity sap.orgmgmt::Employees {
    EmployeeDetail Association to EmployeeDetails;
}
// Afterwards he can include fields from the customer entity/table
into the SAP-View by
// adding using the new Association:
extend view sap.orgmgmt::EmployeesView {
    EmployeeDetail.Rating as rating,
    EmployeeDetail.careerPlan as careerPlan
}
```

Figure 9:
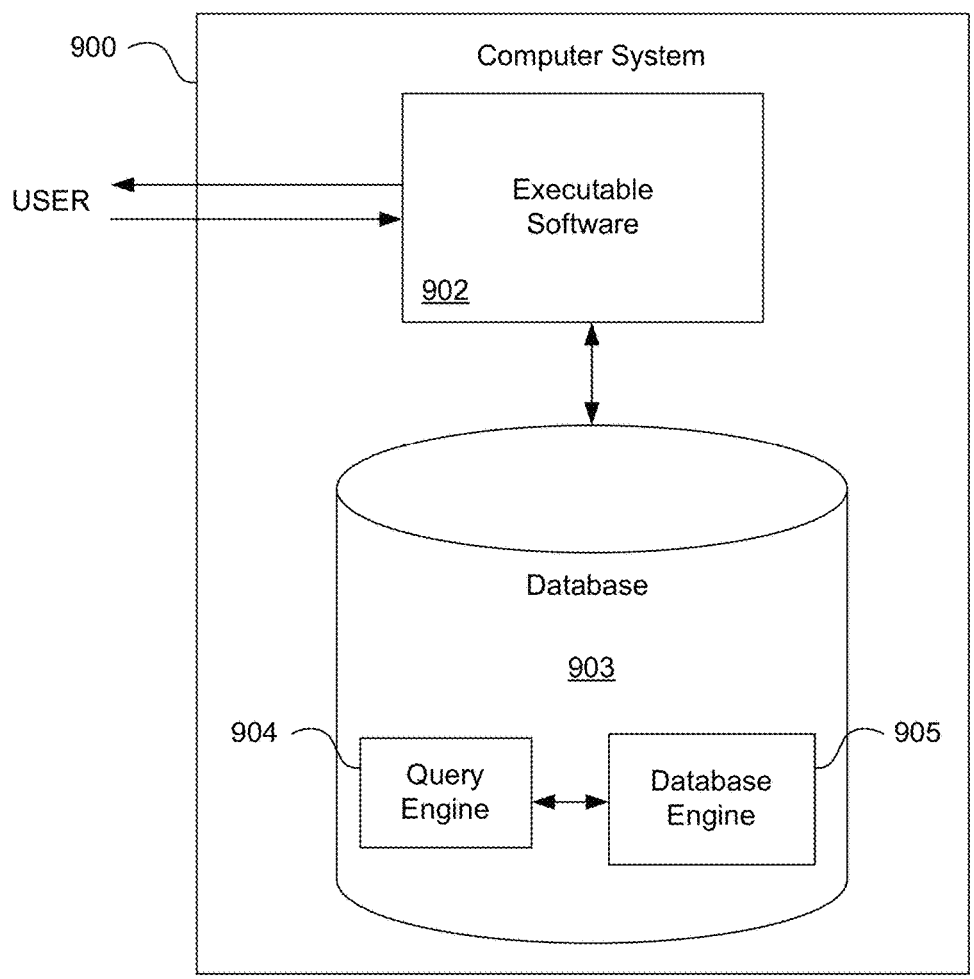
FIG. 9 illustrates hardware of a special purpose computing machine configured to extend database entity-relationship models execution according to an embodiment.

FIG. 9 illustrates hardware of a special purpose computing machine configured to extend database entity-relationship models according to an embodiment. In particular, computer system 900 comprises a processor 902 that is in electronic communication with a non-transitory computer-readable storage medium 903. This computer-readable storage medium has stored thereon code 904 corresponding to a query engine. Code 905 corresponds to a database engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 10:
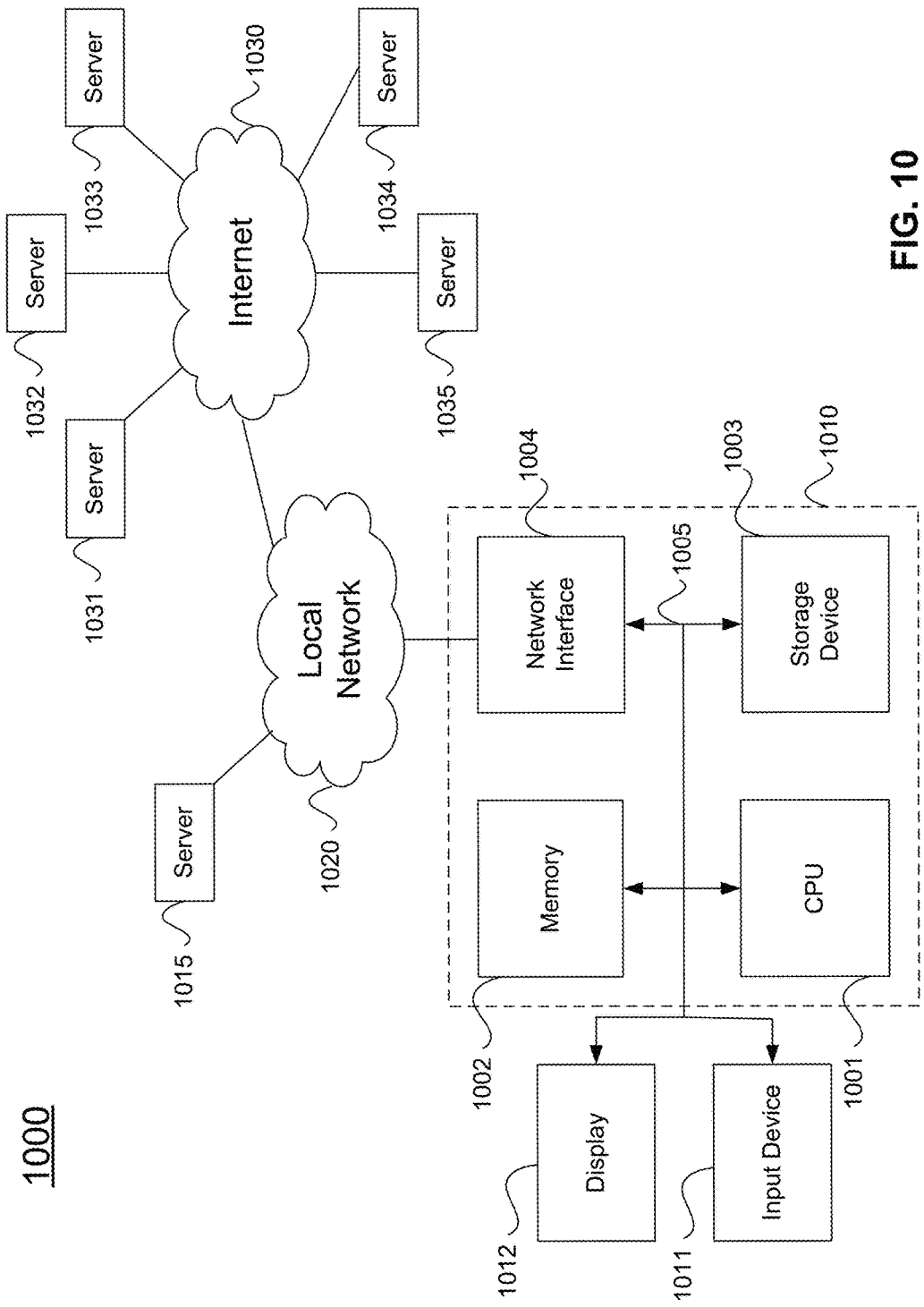
FIG. 10 illustrates an example of a computer system.

An example system 1000 is illustrated in FIG. 10. Computer system 1010 includes a bus 1005 or other communication mechanism for communicating information, and a processor 1001 coupled with bus 1005 for processing information. Computer system 1010 also includes a memory 1002 coupled to bus 1005 for storing information and instructions to be executed by processor 1001, including information and instructions for performing the techniques described above, for example. This memory may also be used for storing variables or other intermediate information during execution of instructions to be executed by processor 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1003 may include source code, binary code, or software files for performing the techniques above, for example. Storage device and memory are both examples of computer readable mediums.

Computer system 1010 may be coupled via bus 1005 to a display 1012, such as a cathode ray tube (CRT) or liquid crystal display (LCD), for displaying information to a computer user. An input device 1011 such as a keyboard and/or mouse is coupled to bus 1005 for communicating information and command selections from the user to processor 1001. The combination of these components allows the user to communicate with the system. In some systems, bus 1005 may be divided into multiple specialized buses.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1004 sends and receives electrical, electromagnetic, or optical signals that carry digital data streams representing various types of information.

Computer system 1010 can send and receive information, including messages or other interface actions, through the network interface 1004 across a local network 1020, an Intranet, or the Internet 1030. For a local network, computer system (1010 may communicate with a plurality of other computer machines, such as server 1015. Accordingly, computer system 1010 and server computer systems represented by server 1015 may form a cloud computing network, which may be programmed with processes described herein. In the Internet example, software components or services may reside on multiple different computer systems 1010 or servers 1031-1035 across the network. The processes described above may be implemented on one or more servers, for example. A server 1031 may transmit actions or messages from one component, through Internet 1030, local network 1020, and network interface 1004 to a component on computer system 1010. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    providing a database comprising a core data services (CDS) component including a data definition language (DDL) compiler and overlying a lower layer organized according to a relational model and including a first table comprising a base artifact;
    providing a database engine in communication with the database utilizing a data definition language describing the relational model and including a structural extension element associating the first table with a second table;
    providing an application comprising an entity-relationship model including the second table;
    a query engine communicating a query to the database engine utilizing an extended query language accommodating the entity-relationship model, the extended query language comprising an alias;
    the DDL compiler referencing the alias to uniquely identify that the structural extension element is referenced by the query, and
    the database engine returning a query result including data from the first table to the query engine based upon the extended query language.

2. The computer-implemented method of claim 1 wherein the extended query language is an extension of structured query language (SQL).

3. The computer-implemented method of claim 1 wherein the query is a view query.

4. A computer-implemented method as in claim 1 wherein the alias comprises an explicit alias indicating extension of the relational model.

5. A computer-implemented method as in claim 1 wherein the query includes a context annotation in the extended query language.

6. A computer-implemented method as in claim 1 wherein the query includes an entity extension identifying the second table as an entity of the entity-relationship model.

7. A non-transitory computer readable storage medium embodying a computer program for performing a method, said method comprising:
    providing a database comprising a core data services (CDS) component including a data definition language (DDL) compiler and overlying a lower layer organized according to a relational model and including a first table comprising a base artifact;
    providing a database engine in communication with the database utilizing a data definition language describing the relational model and including a structural extension element associating the first table with a second table;
    providing an application comprising an entity-relationship model including the second table;
    a query engine communicating a query to the database engine utilizing an extended query language accommodating the entity-relationship model, the extended query language comprising an alias;
    the DDL compiler referencing the alias to uniquely identify that the structural extension element is referenced by the query, and
    the database engine returning a query result including data from the first table to the query engine based upon the extended query language.

8. A non-transitory computer readable storage medium as in claim 7 wherein the extended query language is an extension of structured query language (SQL).

9. A non-transitory computer readable storage medium as in claim 7 wherein the query is a view query.

10. A non-transitory computer readable storage medium as in claim 7 wherein the alias comprises an explicit alias indicating extension of the relational model.

11. A non-transitory computer readable storage medium as in claim 7 wherein the query includes a context annotation in the extended query language.

12. A non-transitory computer readable storage medium as in claim 7 wherein the query includes an entity extension identifying the second table as an entity of the entity-relationship model.

13. A computer system comprising:
    one or more processors comprising a database engine and a query engine;
    a software program comprising code stored on a non-transitory computer-readable storage medium, executable on said processors, the software program configured to:
    provide a database comprising a core data services (CDS) component including a data definition language (DDL) compiler and overlying a lower layer organized according to a relational model and including a first table comprising a base artifact;
    provide the database engine in communication with the database utilizing a data definition language describing the relational model and including a structural extension element associating the first table with a second table;
    provide an application comprising an entity-relationship model including the second table;
    cause the query engine to communicate a query to the database engine utilizing an extended query language accommodating the entity-relationship model, the extended query language comprising an alias;
    cause the DDL compiler to uniquely identify that the structural extension element is referenced by the query; and
    cause the database engine to return a query result to the query engine including data from the first table based upon the extended query language.

14. A computer system as in claim 13 wherein the extended query language is an extension of structured query language (SQL).

15. A computer system as in claim 13 wherein the query is a view query.

16. A computer system as in claim 13 wherein the alias comprises an explicit alias indicating extension of the relational model.

17. A computer system as in claim 13 wherein the query includes a context annotation in the extended query language.

18. A computer system as in claim 13 wherein the query includes an entity extension identifying the second table as an entity of the entity-relationship model.

* * * * *